US010733350B1

(12) United States Patent
Prasad et al.

(10) Patent No.: US 10,733,350 B1
(45) Date of Patent: Aug. 4, 2020

(54) ON-CHIP AND SYSTEM-AREA MULTI-PROCESSOR INTERCONNECTION NETWORKS IN ADVANCED PROCESSES FOR MAXIMIZING PERFORMANCE MINIMIZING COST AND ENERGY

(71) Applicants: Sharat C Prasad, Saratoga, CA (US); Subir Ghosh, San Jose, CA (US)

(72) Inventors: Sharat C Prasad, Saratoga, CA (US); Subir Ghosh, San Jose, CA (US)

( * ) Notice: Subject to any disclaimer, the term of this patent is extended or adjusted under 35 U.S.C. 154(b) by 0 days.

(21) Appl. No.: 16/375,684

(22) Filed: Apr. 4, 2019

Related U.S. Application Data

(63) Continuation-in-part of application No. 15/445,844, filed on Feb. 28, 2017, now abandoned.

(60) Provisional application No. 62/273,373, filed on Dec. 30, 2015.

(51) Int. Cl.
| | |
|---|---|
| *G06F 17/50* | (2006.01) |
| *G06F 30/392* | (2020.01) |
| *H04L 12/24* | (2006.01) |
| *G06N 5/02* | (2006.01) |
| *G06N 7/00* | (2006.01) |
| *G06F 9/48* | (2006.01) |
| *G06F 30/33* | (2020.01) |

(52) U.S. Cl.
CPC .......... *G06F 30/392* (2020.01); *G06F 9/4893* (2013.01); *G06F 30/33* (2020.01); *G06N 5/022* (2013.01); *G06N 7/005* (2013.01); *H04L 41/12* (2013.01)

(58) Field of Classification Search
CPC ...... G06F 30/392; G06F 30/33; G06F 9/4893; G06N 7/005; G06N 5/022; H04L 41/12
See application file for complete search history.

(56) References Cited

U.S. PATENT DOCUMENTS

| 2004/0103218 A1* | 5/2004 | Blumrich | .............. | F04D 25/166 |
| | | | | 709/249 |
| 2006/0047849 A1* | 3/2006 | Mukherjee | ........ | G06F 15/17375 |
| | | | | 709/238 |
| 2016/0226734 A1* | 8/2016 | Pandey | ..................... | H04B 3/00 |

\* cited by examiner

*Primary Examiner* — Nghia M Doan
(74) *Attorney, Agent, or Firm* — Plager Schack LLP; Mark H. Plager; Alexis J. Saenz

(57) ABSTRACT

A chip design environment is disclosed which accepts application specific processing, memory and IO elements and declarative specification of function, cost and performance of peripheral, low-level and infrastructural elements and of overall design and generates synthesizable module RTLs and relevant place-and-route constraints. The generated elements include the network interconnecting all the elements, a programming memory consistency model and its coherence protocol, allocation and scheduling processes realizing run-time inference of optimal parallel execution and processes for control of coherence action and prefetch intensity, task-data migration, voltage-frequency scaling and power-clock gating. The environment employs knowledge bases, models to predict performance and to assign confidence scores to predictions and, in turn, the predictions to explore space of topology, architecture, composition, etc options. The environment generates synthesizable module RTLs to complete the design and relevant place-and-route constraints. User may simulate the synthesized design. If a user shares simulation results, the environment may evaluate the predicted performance against performance determined by simulation and use the results to update its knowledge and models.

19 Claims, 6 Drawing Sheets

Overall Synthesis Flow

Hybrid - Crossbar and Bus - Topology

A Job

An Interconnection Network

Mesh NOC

Traditional Chip (Black Wires - Signal, Red - Power Distribution Control
Blue - Clock Distribution Control)

NWI Environment Designed Chip (s - Sensor, a - actuator, wires - NOC Providing for Signal,
all Sensor Reading and all Actuation)

Chips - Traditional and Designed by Environment of Invention

Resource Sharing

Fractional - N Multiplying DLL

Fractional - N Multiplying DLL with Delta-Sigma-Noise-Cancellation

Fractional - N Multiplying DLL with Delta-Sigma-Noise-Cancellation Detail

ON-CHIP AND SYSTEM-AREA MULTI-PROCESSOR INTERCONNECTION NETWORKS IN ADVANCED PROCESSES FOR MAXIMIZING PERFORMANCE MINIMIZING COST AND ENERGY

CROSS-REFERENCE TO RELATED APPLICATIONS

This application claims benefit under 35 U.S.C. § 119(e) of pending U.S. Non-Provisional application Ser. No. 15/445,844, filed Feb. 28, 2017, which claims benefit of U.S. Provisional Application having Ser. No. 62/273,373 filed Dec. 30, 2015, which is hereby incorporated by reference herein in their entirety.

BACKGROUND

Currently, there is a great deal of expense, time, and effort on the part of architects and designers of application (e.g. mobile, desktop, server, graphics, network, etc.) processors to acquire state-of-art knowledge in low-level, peripheral and infrastructural components and their design. When designing multiprocessor and other chips, up to 75% of the effort is spent independent of the target application of the processor and instead is spent on low-level, peripheral and infrastructural problems related to, for example, voltage regulation, frequency synthesis, power and clock distribution, power-clock gating, voltage-frequency scaling, interconnection network, parallel programming memory consistency model, synchronization and coherence protocols, facilitating execution of programs maximizing parallelism gain and minimizing communication and power. The design of or the processes used for solutions for the above problems may be individually worse than what is state-of-art and may not be components of an optimal and complete framework.

There exists much inefficiency in the current approaches to chip design and interconnection networks. Different low-level, peripheral and infrastructural tasks may duplicate sensors, statistics collection, control elements and the communication pathways between each. The same information required by different mechanisms may be inconsistent. The interconnection network topology, the communication mode and the schemes employed by the low-level, peripheral and infrastructural functions may be poorly matched to requirements. Various controls may be open loop which do not adapt, may adopt overly conservative values for design parameters, and may use closed-loop feedback which adapts reactively, or may use predictive control which also adapts reactively albeit to a forward predicted state resulting in loss of function, performance or power efficiency. Internal memories and functional blocks of cores are either used at some power cost or are not used at some silicon area opportunity cost. Transaction order enforcement, required by the programming memory consistency model, may be duplicated and may be carried out at both 'high-level' by Processing Elements (PEs) and at 'low-level' by network transport message order enforcement. With virtualization becoming accepted computing practice, a server may host a virtual machine (VM) running an OS with one and a second (VM) running a second cache management and coherence protocol. With datacenters becoming integral to the way large scale computing is done, for large applications, great latency and power reductions are possible by correctly matching the parallel computing paradigm and supporting cache coherence management to the application. Coherence and pre-fetch traffic intensity may be too low and may be ineffective or may be too high and may congest the network. The network may waste bandwidth carrying transactions along complete input-to-output paths that conflict with higher priority in-progress transactions and will be aborted or that are pre-fetch traffic invalidated by branch misprediction. Workload characteristics vary too widely to be satisfied by static allocation, scheduling and control policies. It is a challenge to write programs that run efficiently on all parallel architectures. Even when sub-tasks of a task are executed in parallel, the time cost of loading and moving sub-task data and code is incurred.

Field Programmable Gate Arrays (FPGAs) provide a flexible interconnect. At present their interconnect design is based almost entirely on space-division and contributes to overly large chip area usage and power consumption of these devices.

SUMMARY

In one aspect, a method of synthesizing a design of a multi-core system on a chip is disclosed. The method comprises reading a chip floor plan into a model synthesizer, wherein the chip floor plan includes a plurality of processor elements; selecting a network topology for the chip floor plan, wherein the network topology includes: sensors, interconnection networks, network routers and network interfaces connecting the plurality of processor elements, voltage regulators, and frequency synthesizers, wherein the sensors, interconnection networks, network routers, network interfaces, voltage regulators, and frequency synthesizers are selected based on selected application; selecting placement of the sensors, interconnection networks, network routers, network interfaces, voltage regulators, and frequency synthesizers in the network topology; selecting placement of voltage regulation, frequency synthesis and inter-synchronization-domain FIFO control actuation elements; selecting topologies of power and the clock distribution network links and a topology and modes of operation of an integrated network for data communication and for communication with the sensors and the actuation elements; composing controllers for coordinated coherence action and prefetch intensity, core folding, voltage-frequency scaling and power-clock gating; selecting a programming model; designing synchronization and coherence protocol messages for the programming model; composing a central allocation, scheduling and control engine for the plurality of elements; generating an architecture simulation model of distinguished hosts, the network interfaces, the network routers and of network central controllers; positioning the distinguished hosts, the network routers, the network interfaces, and the network central controllers in the chip floor plan; and positioning the interconnection networks and the power and clock distribution network links in a chip routing plan.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
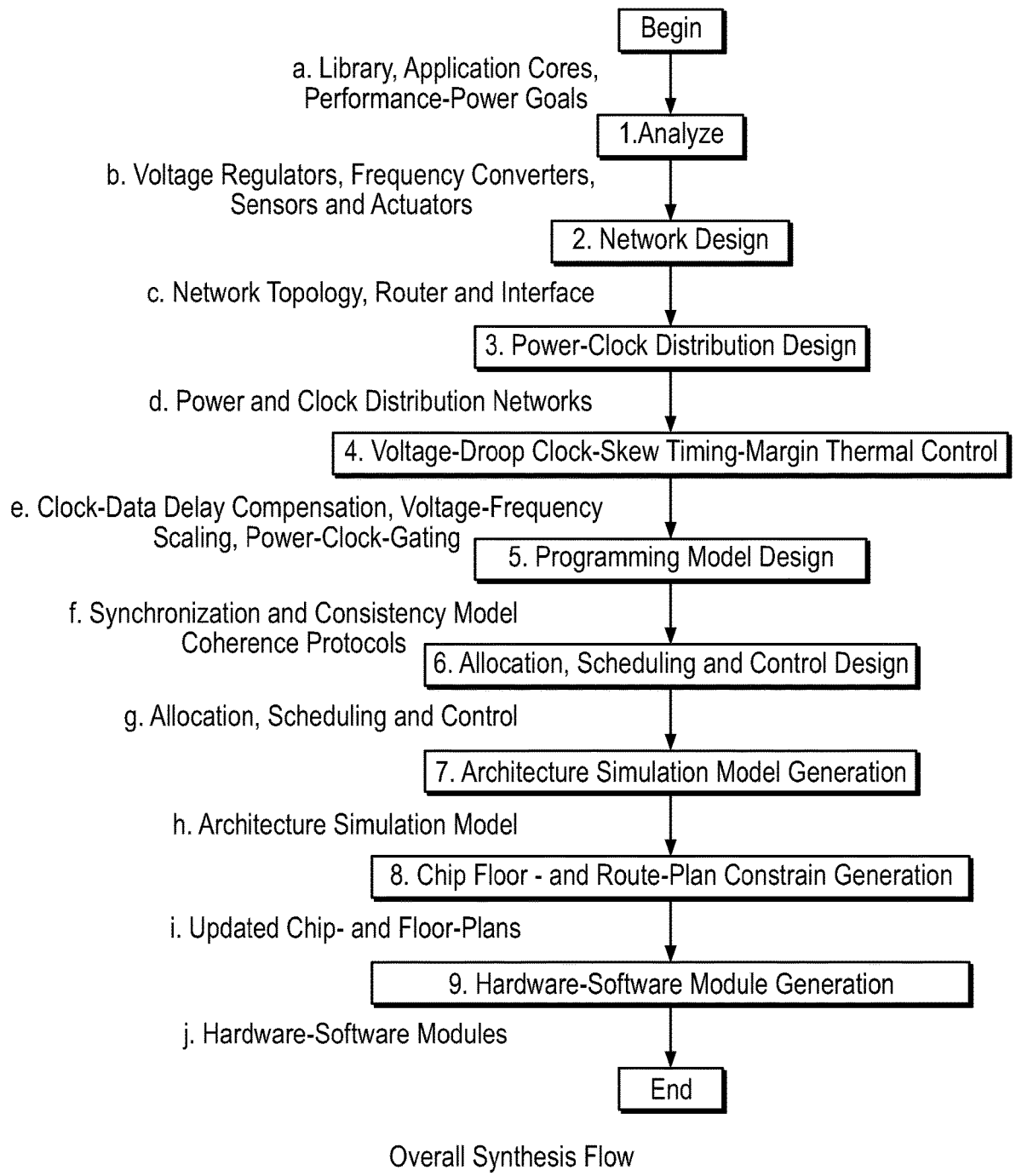
FIG. 1 is a flowchart of a process for synthesizing a multiprocessor with an on-chip network(s) according to embodiments of the subject technology.

In general, embodiments of the disclosed subject technology provide sub-systems, a design synthesis system and processes that make it unnecessary for the application processor architect and designers to acquire the knowledge of the state-of-art of the peripheral, infrastructural and low-level components of the design or an application processor design to spend up to 75% of the total effort on those considerations. Embodiments provide a system that acts as a repository of knowledge of design of low-level, infrastructural and peripheral elements of many core designs that may be used for, for example, system on chip designs. Aspects of the subject technology specifically incorporate among the elements the network interface and router for the network to interconnect the cores, that enable the knowledge to be kept updated, that synthesizes the elements for a many-core chip, that synthesizes simulation models of the elements to make it possible to simulate the chip and interconnection network design prior to chip production. The design synthesis system and processes synthesize sensing, control, peripheral and infrastructural processing elements and the complete sub-systems incorporating networks of the elements suited to multiprocessors and other chips and generates the hardware and software modules. Embodiments may receive input describing the specific application for the processor design and the system automates component requirements based on processes to provide a synthesized design. As will be appreciated, synthesized designs help eliminate wasteful duplication of sensing and control elements. Aspects disclosed employ interconnection networks that, in addition to providing for data communication among main processing elements, provide for communication with sensors and actuators distributed throughout the chip die. The system may simulate the synthesized design performance and may evaluate predicted versus simulated performance results to correct inefficiencies in models used to predict and to assign confidence scores to predictions.

Embodiments include an integrated network and an integrated set of sensors, statistics gatherers, controllers and actuators and actions composed from the same set of basic actions to manage the elements and their operation. The set of sensors include those to sense voltage, power, temperature, clock skew, timing margin, inter-synchronization-domain FIFO occupancy, intensity of pre-fetch, coherence and other traffic and network link backlog. Process variability manifests as two devices displaying difference in a characteristic metric e.g. Ids under same e.g. Vg, Vdd and temperature. It is desired to sense the distribution of or distribution of characteristic metric of P, V, T, . . . . In absence of a Sensing driven method, characterization determines possibly for the worst Process-Voltage-Temperature corner corresponding to acceptable power consumption and reliability the maximum frequency of error-free operation. This results in a frequency being chosen that corresponds to the 'block' where the combination of P-V-T are leading to least frequency. In the sensing driven architecture the relation between voltage-frequency operating points and actual metrics that directly relate to the phenomenon to be encouraged or prevented, e.g. power, temperature, timing margin, etc. is learnt and preceding metrics are directly measured and voltage-frequency operating point is chosen independently in each block. The set of distinguished hosts include voltage regulators, frequency synthesizers and various controllers (that may have been added by the environment that are hosts on the network just as normal hosts, the user cores, are). The set of actuators include power gates, clock gates, voltage conversion ratio setters and frequency conversion ratio setters. The system carries out high-level design but not necessarily the low-level implementation of the power and clock distribution networks. Processes specify attribute values and constraints accepted by the power and clock distribution network design tools in industry standard chip place-and-route systems. The design process(es) may pre-plan the interconnect system. The distribution of process, temperature, voltage and timing error sensors over the die area may be chosen such that a weighted sum of estimation errors at a set of critical points is minimized. Anti-fuses programmed at test time and process management blocks may be included. The sensors, together with per-fine-grained-block control of voltage, frequency, clock delay, etc. make it unnecessary, even given the higher variability in advanced processes, to employ performance sacrificing guard bands and to maximize performance and minimize power consumption. The distribution of distinguished hosts is so chosen as to realize control of power and clocking at a fine enough spatial granularity. The distribution of actuators is so chosen as to make controls responsive and to minimize guard-bands required. The network topology is designed considering both the inter-processor data communication and communication with sensors and actuators. Network topology, possibly a combination of basic topologies— linear bus, ring, crossbar, mesh or torus, is chosen.

The design of or the processes used may leverage information and sub-components from each other and are periodically updated to equal or better the state-of-art. The sub-designs and individual tools also include 'standard' interfaces. All management and control is accomplished by having control theoretic models and processes (logical and non-probabilistic) used at start of operation and by having statistical machine learning improve the models and processes. Models of power and distribution of temperature, voltage and timing margin over the die area as a function of voltage and frequency converter settings may be learnt and are used to select voltage-frequency point and other control variables of operation.

Reading and making use of test-time data written to (anti-) fuses is supported by special network 'hosts'. Appropriate back-bias voltages in FDSOI are obtained from such fuses. Similarly accessed data provides for other simultaneous process-device-circuit co-optimization. All use designs and processes that are individually optimal and ensure that they do not affect others adversely, but that they leverage information and opportunity made available by the framework. Potential circuit timing hazards in themselves and those due to clock skews including clock skews due to variations and voltage droops are dynamically managed by a set of timing error sensors, clock data delay compensation and frequency scaling elements. The sensors, the distinguished hosts, the actuators, the network interconnecting them, the statistical models employed by the control-by-statistical-inference processes and the statistical model learning are jointly designed for optimality. Fixed pipelined transfers and frame-switching is supported by synchronizing local clock to a global reference.

Each of a number, possibly just 1, of physically adjacent network interfaces and routers are made into a group. Each group is its own power-clock and voltage-frequency domain. Each router drives its outgoing links with its own clock. There are clock domain transition first in, first out (FIFOs) at link receive. An on-demand path is setup through a sequence of routers. For circuit-switching pre-planned paths are programmed into tables. For packet-switching, every cell times one of the receive links or the local core is selected.

Ordinarily routers are in a circuit-switched mode for Tf amount of time and in packet switched mode for Tp, where Tf+Tp=Tc, a cycle time where cycles are repeated forever. However the switched mode may be interrupted by an on-demand pipelined mode request. Upon on-demand pipelined mode, normal operation and state of the network is frozen and just the on-demand transfer is carried out. Network interfaces tag packets and network interfaces and routers recognize packets encapsulating different types of transactions. Distinguished packets are employed for transfers that include synchronization and coherence protocol communication, speculative pre-fetch, transactional memory access, messages in distributed memory with message passing programming model etc.

A clock in all transmit network interfaces, standing in a M/N relation to and synchronized to a global reference, is used to time-stamp packets to help schedule and reorder them. Distributed, physically distributed logically shared or shared memory programming model is supported. Full range from strict/sequential to only-upon-explicit-request shared memory consistency model is supported. Synchronization and coherence protocol controllers are provided. Queue organization and service in network interfaces and network routers comprehends not only delay and loss sensitivity of data traffic but also packet ordering requirements arising from memory consistency model. Network router queue admission control is also able to do selective discard of complete protocol data unit (e.g. of the lower-priority source in the event of transactional memory access conflict) and return an indication to the source (e.g. to enable it to retry possibly after obtaining lock). Receiving network interfaces are capable of reordering traffic employing source id, generation time-stamp and transfer type. NIs and NRs gather statistics, an NI makes the statistics available to its PE. The statistics are also logically pooled and made globally available to support tasks e.g. speculative functions of PE. Cohesive integrated control theoretic and machine learning prefetch and proactive coherence assurance intensity control, task and data migration, PE, Cache Slice (CS), network interface and network router voltage-frequency scaling and power-clock-gating is employed.

Again in traditional architecture any sensed metrics are translated into policy governing allocation (the type and/or specific PE for a task or the type, the specific memory for Cache-Slice for a data resource and/or the external memory or Memory Controller Channel to the external memory via facility location, load-balancing, routing, congestion-management) and scheduling (including flow-control) decisions or the decisions using a deterministic non-learning algorithm. In the operation by statistical inference architecture a model either mapping states to high probability actions is learnt or the distribution of state-action pairs is learnt and then actions are drawn from the latter distribution. Allocation, scheduling and control of task code and data blocks to PEs and CSes, including data forwarding route computation, selects, considering exploration-and-exploitation, from among an implicit set of feasible actions chosen by statistical inference and assigned confidence scores, statistical inference actions are used when confidence score is high and otherwise an action computed by a human engineered process is used both to perform control and to on-line train the statistical inference model. Given the architecture dependence, multiprocessor accepts the sequential program and executes it in the most parallel way possible. The detections and optimizations happen at run time. The detections and optimizations encompass parallelization, cache thrashing avoidance, elasticity in timing of coherence protocol steps and pre-fetch traffic and exploitation of application memory access profile.

Similar to the earlier CISC versus RISC studies, there are recent studies that show that for the datacenter supported cloud computing accessed by end users using browsers and Apps, advanced out-of-order speculative large multi-level cache processors on one hand and advanced quality-of-service supporting switch-routers with large buffers on the other hand are not required. Both simpler processors and simpler switches suffice. The design environment enables trading-off degree of out-of-order speculative execution etc. in PE and QoS support in NIs and NRs against area and power.

In place of realizing the CMP as a semi- or full-custom chip, it may be realized in an FPGA. The application processing cores and the interconnect network interfaces and routers may be hard- or soft-cores and interconnections both dedicated and programmed. The environment can be customized for FPGA realizations of designs. The environment can be used to optimize design of base FPGAs themselves. FPGAs designed by the environment incorporate a hard network as the upper-most level of their flexible interconnect that includes dedicated connections to other hard cores, e.g. PCIE, DDRx, etc. and that connects to their conventional flexible interconnect. Base FPGA design takes advantage of capabilities of the environment relating to power, clock, interconnect network, parallel programming memory model and performance power optimized parallel computing.

If PEs have allowed narrow timing margin to data paths to lower cost, have ensured greater timing margin for control and if PE is being used for statistical machine learning or signal processing, the PE may be operated at a voltage-frequency point where control is guaranteed to operate error-free but datapath may see acceptable low errors.

Hardware modules and software library modules to aid the OS in allocating tasks to PEs and data resources to CSes, scheduling tasks and transfers and their control is generated. The scheduler matches tasks with processing speed requirement with cores with appropriate processing speed, senses task progress and transfer backlogs and adjusts PE and NR clocks predictively in online learning framework. Hardware modules include the central queue used by OpenMP. The logical queue is realized as a number equal to a number of discrete core speeds physical queues with support for add and remove operations.

The sub-designs and tools can be used individually by virtue of supporting, sometimes optionally, industry standard interfaces and data formats.

The network topology disclosed has attributes required both by the inter-processor data communication and communication with sensors and actuators. The network supports modes of communication suited to the types of communication. The network links provide a communication path for controllers to carry out allocation, scheduling and control. The design of or the processes used are variations and thermally aware, competitive with or better than the state-of-art and part of a cohesive platform. The sub-designs and individual tools can be used stand-alone as well as part of the platform. The design data and tool execution can be hosted on local servers or on virtual servers obtained from a cloud computing service. In the latter case, module generation service, tool or the complete design synthesis environment may be simply accessed using any WWW browser or using GUI front-ends or command line shell hosted on local workstations. Public cloud hosted data and tool include general statistical models that are available to those chips for transfer learning their specific models that agree to share results of simulations of the specific models as training data for general model.

A system designed by the environment may comprise a large or small number of single multi-processor(s) or chip(s). Each chip has a number of cores, chip level voltage regulators and frequency synthesizers, per-block voltage regulators and frequency synthesizers, power and clock distribution trees and sensors and control elements for them. From a specification of the process, the IOs, the cores and the operating conditions, required distribution of voltage and frequency sources, sensors and control elements is derived. From the given PEs, CSes and Memory Controller Channels (MCCs), performance, power and cost requirements and derived distribution of sensors and actuator elements, network topologies are designed. From power and clocking requirement of PEs, CSes and MCCs and derived sensors, actuator elements and network interfaces and routers, power and clock distribution networks are designed. Given the above and initial performance, power and cost requirements, voltage-droop, clock-skew, timing-merging, voltage-frequency scaling and power-clock gating control process is designed. Given the specifications of PEs, CSes and MCCs and performance, power and cost requirements, a programming memory model is chosen and Synchronization and Consistency Model Coherence Protocol processing is designed. Given the overall architecture and design, the allocation, scheduling and control of tasks, PEs, data resources, CSes, data transfers and transfer routes are designed. Given the hardware architecture and hardware-software processes, the architecture simulation models are generated. Given the hardware modules, chip floor- and route-plan constraints are generated.

Finally the hardware and software module incorporating physical design constraints are generated. The components of the environment include architectures and designs of hardware and data structures and processes for software modules and data structures and processes for automatic synthesis of the modules from performance, power and cost specifications and the integrated environment for all the synthesizers. The modules may include (i) voltage regulators, (ii) one- or multi-tiered voltage regulation architecture, (iii) power distribution network topologies, (iv) frequency synthesizers, (v) one- or multi-tiered frequency synthesis architectures, (vi) clock distribution network topologies, (vii) process, temperature, voltage and timing margin sensors, (viii) distributions of process, temperature, voltage and timing margin sensors, (ix) actuators for control of voltage regulation, frequency synthesis, power distribution and clock distribution, (x) distributions of actuators for control of voltage regulation, frequency synthesis, power distribution and clock distribution, (xi) interconnection network topologies, (xii) interconnection network communication modes, (xiii) programming memory models, (xiv) synchronization and coherence protocols for memory consistency models, (xv) large last level caches, (xvi) transactional execution support, (xvii) interconnection network interface and router modules, (xviii) core folding, voltage-frequency scaling and power-clock gating control and (xix) allocation, scheduling and control of tasks, PEs, data resources, CSes, data transfers and transfer routes.

A method of synthesis for designing many core chips is shown in FIG. 1 according to an exemplary embodiment. In step #1, the technology library (including package information), the design netlist and chip top-level plan in some industry standard format (e.g. the Library Exchange Format and the Design Exchange Format) are read in to the design system. The library may include skeletal cells corresponding to distinguished hosts as they are dynamically composed (the environment design knowledge base includes a set of FOL facts and rules corresponding to each distinguished host). The netlist may include reference to these cells. Die maximum dimensions are determined from package specifications. Chip IOs, if not already specified, are determined, dimensions of PE/CS/MCC/Special-Purpose-Cores matrix and relative placements are chosen. From an analysis of the specifications of the process, the IOs, the cores and chip operation condition (a), locations of process, temperature, power, voltage, timing margin, clock skew, network link backlog and inter-synchronization-domain FIFO occupancy sensing and statistics gathering elements (b) is chosen. The locations for placement on a chip substrate are chosen so as to realize less than specified estimation error at any point. Locations of control elements for voltage regulation, power distribution, power gating, frequency synthesis, clock distribution, clock gating, inter-synchronization-domain FIFO set-point, and etc. control are also chosen. The locations are chosen to achieve less than specified response time for the control to bring supply voltage or clock frequency within specified range upon transients. There is a finite small number of alternative options, a finite small number of alternative topologies for each option and a finite small set of alternative combinations of auxiliary elements to include or not that greatly influence the area and power cost and aspects of their performance. However the product of the numbers of alternatives is large. The number of combinations of a set of cores, a distribution over a set of external request types, a distribution over request inter-arrival times for each request type, a distribution over processing times for each request type, a distribution over switching activity factor for each request type, a distribution over stable-1 factor for each request type, a distribution over inter-message-generation times for each request type, a distribution over message lengths and a distribution over message destinations is infinite. Given a combination and a voltage or a frequency regulation option comprising of a certain regulator and a certain distribution network, a certain expected area and power cost and a certain expected performance results. Each Task Type i corresponds to a Duration, an Activity Ratio and an On Ratio Gaussian r.v.s $X_i^T$, $X_i^A$ and $X_i^O$. Each core has a number of devices $n_i^D$ and a state given by its voltage $v_i$, its frequency $f_i$ and its in-progress task type i. The power is estimated as $n_i^D(av^2f_pf+(1-a)op^{on}+(1-a)(1-o)o^{off})$ where a and o are, respectively, samples of $X^A$ and $X^O$, $p^{on}$ and $p^{off}$ are the per device, respectively, on- and off-state leakage power. Given the desired region of cost-performance space, an option needs to be selected. The space of expected cost and performance is vast. The alternatives for a voltage regulator are Linear, Switching-Capacitive, Switching-Inductive and Switching-Resonant. The alternatives for Frequency Synthesis are analog PLL, digital PLL and all digital PLL and corresponding types of DLLs. For joint design of power and clock distribution networks and power-clock-gating and voltage-frequency-scaling a combined thermal-electric model of die is employed. The die is divided into rectangular regions approximately corresponding to blocks intended to become independent power-clock-gating and voltage-frequency-scaling domains. The group of power loads within a rectangle is assumed supplied by a (sub-) hierarchy of grids with a small number of levels, progressively decreasing spacing and wire width and routed on progressively lower metal layers. Similarly the clock loads within above rectangular regions (or, for brevity, rectangles) are assumed supplied by a (sub-) hierarchy of H-trees with the highest-level tree within the rectangle rooted at the center of the rectangle and a child of the top-level H-tree. Each rectangle is assumed supplied by a clock and a power source at its center. Loads are assumed distributed uniformly and. For thermal behavior a resistor and a capacitor in parallel and in series with an inductor from each block center to each block edge as well as one to the package substrate below and the heat spreader above is considered. The stochastically varying circuit activity down to H-tree leaves and obtained from characterizing simulation of the cores, static and dynamic power consumption, the heat generation and removal, the temperature, the supply currents, the voltage droops, the clock skews and power-clock-gating, power-clock-distribution adaptation and voltage-frequency-scaling response is modeled. Individual elements in a vector—the input vector—capture each of the aspects listed above. Similarly elements in a vector—the output vector—capture each aspect of resulting performance and cost. Table I and II show elements of the input vector. (Loss of) throughput, latency and power costs make up the output vector. Using off-line simulations for set of cores, L2 caches, memory controller, memory, I/O, etc., as for recent many core processors for workstations, servers, smart phones, tablet computers, game consoles, network, etc., a Deep Convolutional Neural Network was trained to map input-vector to output vector. When a new many core chip needs to be designed, a set of choices may be made, the input vector may be assembled, the derivative $\partial y/\partial x_n$, as required for gradient descent, of a composite cost y with (loss of) throughput, latency and power as components with respect to input vector $x_n$ may be computed, input vector may be updated as $x_{n+1} \leftarrow P(x_n - \eta \partial y/\partial x_n)$ and the process may be continued until a (local) minimum of y is reached. The complete process from making a set of initializing choices for design elements, capturing them in $x_0$, carrying out gradient descent to reach $(x_{n+1}, y_{n+1})$ may be repeated a few times and the $(x_{n+1}, y_{n+1})$ corresponding to smallest $y_{n+1}$ may be selected. Particular attention must be paid to presence of both the 'maximum number of blocks, maximum number of process sensors in a block, etc.' and the 'number of blocks, number of process sensors in block i, ... etc.' quantities and the one-hot coded representation with bit-vector length equal to the maximum number for concepts such as 'Inter-Synchronization-Domain FIFO i source block'. Making bit-vector length equal to the maximum number allows learning to be carried out using small examples but then used for solution of problems of size up to the maximum number. For evaluating selection of types and locations for sensors, actuators and distinguished hosts, for each set of locations, few power distribution, clock distribution and data interconnection networks are constructed. However the network information is discarded and only the set of types and locations corresponding to the smallest cost is retained.

Figure 5:
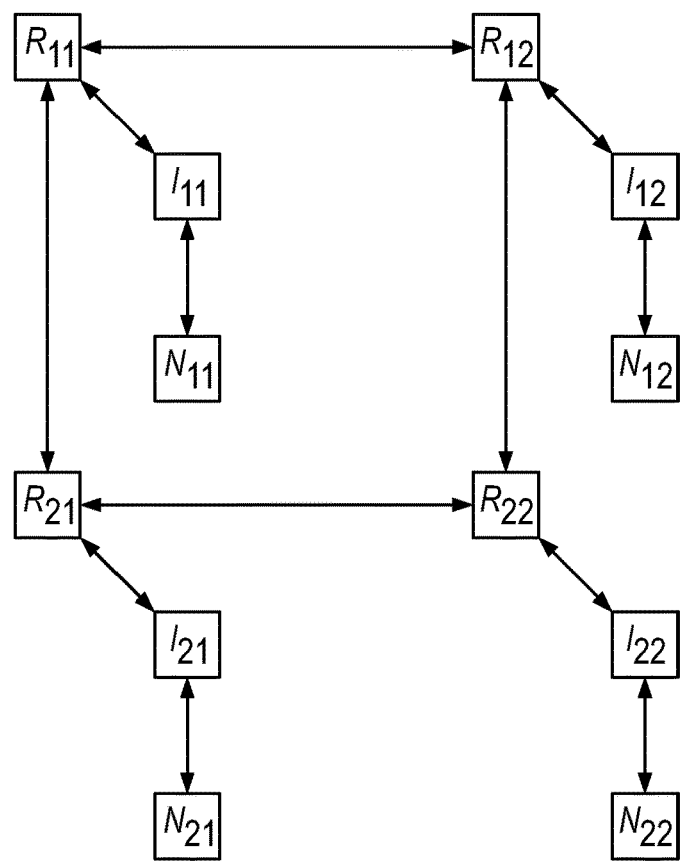
FIG. 5 is a schematic diagram of mesh based interconnection network for a chip design according to embodiments of the subject technology.
Figure 7:
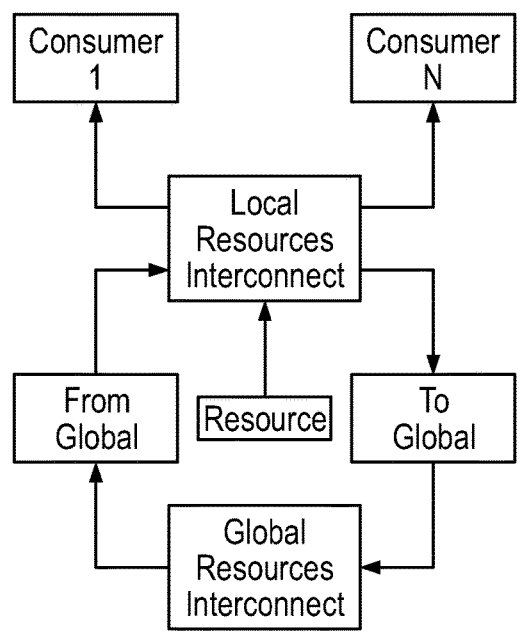
FIG. 7 shows Resource Sharing in ICs of design by environment of invention.

In step #2, network topology and modes of operation, possibly a combination of basic topologies and a combination of basic communication modes, are selected. Die maximum dimensions, chip I/Os and dimension of the PE, CS and MCC matrix identified in step #1 guide the selection of the network topology and modes of operation. Each core is characterized by a type and each core type by three 3-tuples of distributions. The first 3-tuple pertains to pipelined transfers, the second to circuit-switched transfers and the third to packet-switched transfers. The three distributions in a 3-tuple are over inter-transfer-times, transfer-lengths and transfer-far-end core-types. A Gaussian Mixture Model with a less than or equal to 3 component Gaussians is used for each distribution. In sequence starting from 1, up to some maximum number, for number of clusters equal to this number, the cores, distinguished hosts and chip I/Os are assigned to clusters where each cluster is geographically contiguous. For the case of presently selected number of clusters, considering the number of cores and/or chip I/Os in each cluster, the largest number is determined. This number is set as the number of end-points to be served by the corresponding network interface. The address assigned to end-points is divided into upper bits that identify the network interface and lower bits that identify an end-point served by the network interface. The center of mass of the geographical region is set as the location for the network interface and, if required by the topology, the router. When the number of clusters is small, linear bus, ring and crossbar topologies are explored. For larger number of clusters the mesh topology is explored. Network Router Elements (or, for brevity, Network Routers) comprises a number of network interfaces and the central-switch. FIG. 5 illustrates an embodiment of a topology implementing a—2×2 2-dimensional mesh network on a chip. The boxes labeled "N" represent nodes that perform main processing of elements (for example, I/O, cache functions, etc.). Boxes labeled "R" represent routers. Boxes labeled "I" represent interface blocks between routers and nodes. Each is made its own power-clock domain allowing any interface and/or the switch to be power-clock-gated-off and voltage-frequency-scaled.

a. A core complex is endowed with an average rather than the peak amount of memory and power and clock conversion resources. The interface of a core complex to data interconnection and power clock distribution backbone enables the memory and power and frequency conversion resources in a power-gated-off complex to be made available to another complex. Generally, input interfaces of the components include a Mux enabling either the host core logic or Network Interface, and in turn, another core to drive them and outputs of the components are twocast to both the host core as well as the Network Interface and in turn another core (FIG. 7). Memory being a digital block is easy to be use in the indicated fashion. Voltage Regulators often have two a source- and a load-side section. Load-side section is local to the host core the supply-side section can be remote and in a powered off core. In case of a capacitor, capacitors of some capacitance value connected in parallel realize a capacitor of a capacitance value equal to the sum of the capacitance values. Resistors and Inductors on the other hand need to be connected in series to realize larger resistance/inductance. MOSFET transistors as switches and muxes realize desired series and/or parallel connections. Using offline simulations, Deep Convolutional Neural Networks have been trained to map the combination of topology and traffic load to expected performance and power. At network topology design time, given a topology-traffic combination, the combination is represented as a high dimensional vector, the Neural Network is used to obtain the estimate of cost with latency, power, etc. components, derivative of the cost with respect to the vector is computed and gradient descent is used to find the vector (hence the topology) with the minimum cost. The process is repeated a few times with different initial clustering at each number of clusters. Finally, for this number of clusters, the vector representation of topology with minimum cost is selected. The vector representation of topology includes bandwidth of network links, the number of wires per link and methodology for sharing wires among communication modes and same corresponding to the minimum cost vector are chosen. Network host interface, network router and network central controller organizations are composed.

b. Network Router modules (unlabeled boxes in FIG. 2 and boxes labeled 'R' in FIG. 5) connect network links. Two organizations are supported. In the first organization, at the outgoing interface of each router is a tri-state-able register and the output of the register is connected to row (or horizontal) wire, the incoming interface is from the column (or the vertical) wire and there is a tri-state-able registered interconnection from each row to each column wire. For fixed-pipelined mode of operation, during clock cycle 1, for each row wire, none or one of the routers connected to the row wire is selected to drive it. During clock cycle 2, for each column wire, none or one of the row wires is selected to drive it. During clock cycle 3, some of routers register in the data on the column wire they are connected to. Hence this organization allows any-to-any point traversal in three clock cycles. By appropriately sizing the drivers, the traversal can be accomplished in one clock cycle. Crowbar (so called because current from 'supply' on top-left is flowing to 'load' on middle-right and current from 'load' on middle-right to 'ground' on bottom-left) current resulting from, for example, new driver coming on before old driver is turned off can be avoided by using opposite edges for turning on and off the tri-state enables. In the second organization, network router (Rij) module may have up to 5 interfaces—to/from north, to/from east, to/from node interface (Iij), to/from south and to/from west. The router drives, its outgoing interfaces with its own clock and has an asynchronous FIFO at each of the incoming interfaces. When the NI indicates ready, the source may provide the data and indicate valid. At the other end when there is data, the NI indicates valid and destination may indicate ready when it is registering the data. Irrespective of the topology, the interconnect appears like a source-synchronous interface with valid-ready controls. Irrespective of the topology, the interconnect appears like a FIFO to the source and the destination. For circuit-switched operation, in the organization 1 network, at each of its outputs, there is a vector register of length equal to frame duration. During a slot of the frame, a router drives onto its output the value received during previous slot from input i if there is an i, $1 \geq i \geq N$ in the corresponding position in the corresponding vector register. The organization 2 network is considered to be carrying fixed length packets. The packets on the link are separated by an amount of inter-packet-gap that is proportional to the jitter arising from clock frequency conversion in each voltage-frequency-domain. During each fixed-length packet time, each output selects as the source the input indicated in the corresponding slot of a fixed length frame of packet time slots. For Packet-Switched mode of operation, during each cell time, each router receives zero or one cell from each of its from-east, from-south, from-west, from-north and from-core interfaces. Each cell carries a destination-id in its header. The destination-id is used to look-up the outgoing interface, the routers are internally non-blocking and are able to deposit the fixed-length packets into the queues corresponding to their respective outgoing interfaces. Cells carry a delay priority in their header to identify the queue. During each cell time, each router also transmits up to one cell out of its to-east, to-south, to-west, to-north and to-core interfaces. Live- and dead-lock prevention and quality of service consideration require that there be more than one class-of-service queue at each outgoing interface of each router. A weight is assigned to each of the queues and the queues are served in proportion to the weights. The cells carry a drop-priority different from delay-priority. The cells also carry a start-of-packet marker. These together are used, for example, to preferentially discard cells belonging to a speculative fetch invalidated by a mis-predicted branch. Network interface and router module include packet buffer admission control, packet tagging and packet scheduling including for packet order enforcement (Algorithm 1) and transaction conflict management (Algorithm 2) functions.

c. In an m×n 2d-mesh, each node in each instant generates an mn element vector indicating intended targets of its packet. Sum the vectors element wise (alternatively each node outputs mn wires, each node receives mn wires and each wire is carrying a 0 or a 1. Summing per node generates mn sums each a value between 0 and mn−1. Alternatively each row produces mn sums. Each column takes m sets (one set per row) of n sums (one per column) each and produces m sums. The i-th sum indicates the number of packets intended for node i. Node i reserves these many slots in its receive queue and tags them with current instant number. If more than one packet is intended for a node during an instant, it can process these in arbitrary order. However it must process all packets from earlier instants before it can process packet from current instant. Each in each instant also generates one element indicating whether it has a packet. The i-th node receives p equal to sum of elements upto node i−1 (id of its packet, if it has one, is p+1), adds in its element and outputs the new sum p'. When a source NI transmits a packet, it also outputs the packet-id, instant of generation of the packet and destination mask of the packet. When a destination NI receives a packet, it puts it in a slot tagged with the instant of generation of the packet.

d. Congestion hot-spots may develop in the fabric. Multi-path routing can relieve congestion. Multi-path routing may result in out-of-order transfers. Mechanism to reorder is required. There is a notion of interface cell time. At cell time k, every core generates an mn bit vector. If bit i of this vector is a 1 then core i is one of the destinations of the cell of the core. If we perform an element wise add of these vectors, then element j of result, Mj, is the number of cells destined to core j. NI j egress reserves these many cell slots in its to-core queue and labels them with k. Each cell generated by any core carries its generation time k in its header. When a cell reaches its destination router, it is placed in its to-core queue in a cell slot that is labeled k. If the cell in the head slot, labeled k', is yet to arrive, any cells that have already arrived but are in one of the following slots and are labeled k>k', cannot be passed on to the core. However a cell in a non-head slot may be passed on to the core if its slot and every slot ahead of it, including the head slot, are labeled k. If we grow the size of the vector to 2mn where first mn elements correspond to reads and next mn elements to writes, during instant k each router reserves $M_j^R$ and $M_j^W$ cell slots in its to-core queue and labels them (and hence read slots precede the write slots labeled with the same instant), respectively with the pair (k, 1) or (k, 0), a cell in a non-head slot may be passed on to the core if it is labeled (y, 1) and all the slots ahead of its slot are labeled (x, 0) even if y>x. Consider M threads, thread i is a directed graph with vertex set Vi, edge set Ei and diameter Wi. There are N shared variables. Thread i performs jth read (write) at instants $t_{ij}^R$ ($t_{ij}^W$) to shared variable $v_{ij}^R$ ($v_{ij}^W$). TSO consistency requires order among writes and among reads but not from any write to a read from a different address. Consider that the first router common to the path from core i to LLC/MC and the path from core p to LLC/MC maintains the state that a write to variable $v_{ij}^W$ is in progress, sees a read to $v_{pq}^R = v_{ij}^W$ now being requested and returns the value from the $v_{ij}^W$. Consider a particular write, e.g. one issued at $t_{i'j''}^W$ to $v_{i'j''}^W$. The value written to $v_{i'j''}^W$, was computed using values of variables read at $t_{i'j''}^R, \ldots, t_{i'j''+m-1}^R$ where $t_{i'j''}^R < \ldots < t_{i'j''+m-1}^R < t_{i'j''}^W$. The write will be valid if $v = v_{i'j''+m-1}^R \rightarrow v \notin \{v_{ij}^W | 1 \le i \le N, 1 \le j \le M_i\} \lor v = v_{pq}^W \land t_{pq}^W < t_{i'j''+k-1}^R \lor t_{pq}^W > t_{i'j''+k-1}^r$. Assume the first packet, carrying the read $t_{i'j''}^R$, also carries a "Start-Of-Transaction" marker. Variable $v_{i'j''}^R$ may have been in L1-cache of core i' and NOC would not see any $v_{i'j''}^R$, -read-request packet. However then when another core issues a read or a write $t_{pq}^X$ with $v_{pq}^X = v_{i'j''}^R$, a coherence check packet may be injected by core p. When this packet gets to either the first router, say $R_{uv}$, that has seen $v_{i'j''}^R$, the LLC or the memory controller and this is a write-request, either core i' or core p, depending on which is lower priority, is sent an abort and/or transition the executing thread to sleep. To send the abort, $R_{uv}$ or the router attached to LLC or the MC, needs to maintain the state equivalent to sets of variables encompassed by active transactions. The set may be initialized by the packet carrying the first variable read or coherence check also including the Start-of-Transaction marker. The set may be garbage collected once the response to packet carrying End-of-Transaction is seen.

In step #3, distinguished hosts comprised of test-time programmable (anti-)fuses, Process Monitoring Blocks, voltage regulators, frequency synthesizers, power and clock gates, inter-clock-domain synchronization FIFOs, process/thread scheduling hardware assist engines, core statistical learning and inference engines, etc. are designed. The voltage regulators include a central regulator to convert the external voltage to an on-chip distribution voltage and per fine block regulators to convert the distribution voltage to the voltage to be provided to the devices in the block. The central regulator is of Switching-Capacitive, Switching-Inductive or Switching-Resonant type. The per-block regulators are Linear, Switching-Capacitive, Switching-Inductive or Switching-Resonant type. In case of both the central and the per-block regulators, a topology that is the hybrid of two or more basic topologies and/or a number of improvements may be used. The improvements raise the performance and/or lower the cost by addressing a number of issues. The framework enables forming of the hybrid topologies and inclusion of improvements. At any time the environment and the tools are capable of forming a number of hybrid topologies and including a set of improvements. However the set of hybrid topologies and the improvements are periodically revised to reflect the advancing state of art.

a. Phase Noise beyond a lower bound has been difficult to achieve in bulk CMOS technology. Thin film magnetics for inductors have challenges. On-die switching Fully Integrated Voltage Regulator (FIVR), though a very good solution, requires inductors that may not be available. Linear LDOs are susceptible to di/dt droops. Power Gates and/or linear regulators such as LDOs, required to subdivide the FIVR domains, are usually for current <250 mA and insufficient to power a microprocessor core. Though Digital LDOs, which regulates the duty-cycle input to the gate of a PG transistor, achieve high current, exhibit some ripple on the output and have lower accuracy of the supply than analog solutions. Switched-Capacitor convertor, though having a favorable energy density, suffers from limited output range and intrinsic charge sharing loss. Absolute current sensors suffer from bandwidth limitation. Linear regulators offer high linearity and small output voltage ripple but suffer from poor efficiency. Switching regulators achieve high efficiency but have poor linearity and large output voltage ripple. Using a number of, though small area and loss, regulator-per-domain to address the requirement of large number of domains suffers from large area. Single-Inductor-Multiple-Output (SIMO) converters where inductor only supplies one output at a time, though realize high efficiency, fast load transients and small ripple, suffer from instability. SIMO converters employing PLL-based control to control all but the last output overcome instability but suffer from poor cross regulation in load transient conditions. Coupling multiple cores allows PN to be reduced below what is otherwise possible. Air-core slab inductors with specially designed current return paths are CMOS compatible, are able to overcome challenges of thin-film magnetics, achieve ultra-high-Q and >90% efficiency for on-chip power delivery. LDOs do not require inductors. A modified flipped source follower driver circuit can be used to minimize di/dt droops. Power Gates and/or linear regulators such as LDOs can subdivide the FIVR domains. Digital LDOs, which regulates the duty-cycle input to the gate of a PG transistor, achieve high current. Ripple can be reduced in Dual-use LDO—Power Gate, by using a portion of the PG transistors as LDO drivers, by having the driver be distributed across the expanse of the load, be contained in a feedback loop and include a slower feedback loop to regulate the DC-voltage. Resonant switched capacitor topology can overcome limited output range and intrinsic charge sharing loss limitations of the SC topology. The bandwidth limitation of absolute current sensors can be overcome by using ripple current sensor. A Hybrid Supply Modulator, by combining a wideband linear amplifier and a high efficiency switching stage in parallel, offer an optimized trade-off among efficiency, linearity and output voltage ripple. The SIMO capacitor converter can create multiple domains using only one inductor enabling substantial reduction in area. SIMO converters controlling both switching frequency and switching order of outputs employing error based control achieve stability in addition to freedom from poor cross regulation during load transients and high efficiency. A Successive Approximation SCR overcomes the coarse voltage granularity limitation by cascading 2:1 conversion stages. LDOR can improve their current drive by reusing part of their power gate transistors for driving loads. A dual-use LDO/PG, by using a portion of the core PG transistors in LDO mode by biasing using an analog voltage, is able to drive high currents and use on-chip compensation to improve efficiency. Limitations of SC regulators include coarse voltage granularity. LDO and other regulators suffer from di/dt droops and cannot drive high capacitive loads without external compensation method. Analog LDOs are for currents <250 mA. Though digital LDOs are able to achieve high currents by modulating the duty cycle input to the gate of the Power Gate transistor, they suffer from ripple on the output and poor accuracy. Thin film magnetics for inductors have challenges.

b. The frequency synthesizers are composed as part of an overall clock generation, distribution and quality assurance and voltage droop, power consumption and performance management scheme. A frequency range for each clock to be available anywhere in the chip is accepted. The chip is divided into non-overlapping square leaf blocks. Leaf blocks are gathered into blocks. A number of loads are associated with each clock in each leaf block. A central frequency synthesizer accepts the external reference frequency and generates a distribution frequency that is in turn used by per block frequency synthesizers to generate the frequency of the clock to be supplied to all devices in respective blocks. Balanced distribution trees are considered. The central synthesizer, the per block synthesizers and the distribution trees are selected from considering the jitter characteristic of the external clock, jitter and skew budget at each leaf block, area budgets for the synthesizers and power budgets for the synthesizers and the distribution tree. As the distribution trees are reconfigurable and an active skew management is incorporated, the jitter and skew budgets are smaller than otherwise. A synthesizer may make use of an LC-tank, a Voltage-Controlled or a ring oscillator, may make use of a tuning mechanism and may make use of a Time- or Voltage-To-Digital-Converter and be, optionally integer- or fractional-N, multiplying, PLL or DLL. The synthesizer may in addition use means to reduce period jitter, phase noise, etc. The selection is made considering the voltage transformation, the regulation, the efficiency, the lock-time, the frequency range, the frequency resolution, the phase noise, requirements. AD-PLLs, due to their use of Time-to-Digital-Converter, suffer from a tradeoff between resolution and power consumption. Fractional-N DPPLs may have high in-band phase noise. LC Digitally-Controlled Oscillators may have coarse frequency resolution. Charge pump based analog PLLs suffer from large area due to the loop filter capacitor needed to implement the integral control portion of the type-II response. DPLLs, while eliminating the large area capacitor by implementing the integral control in digital domain, suffer from degraded jitter performance due to quantization errors introduced by DPLL building blocks such as TDC. DPLLs employing Ring Oscillator based integrator avoid the quantization error but suffer from spurious tones. DPLLs built with standard cells and synthesis tools suffer from poor TDC resolution and issue arising from clock skew. Power and thermal management techniques employing PLL based clock generation suffer from poor lock time, frequency overshoots and a narrow frequency range. Digital fractional-N PLLs suffer from worse phase noise and spurious tones compared to analog PLLs and suffer from excess phase noise. Multiplying Delay-Locked Loops suffer from limitation of integer-N operation and Phase Detector Offset. AD-PLLs can avoid incurring power consumption cost for increased granularity by employing a voltage-domain digitization. In-band Phase Noise performance of Fractional-N DPPLs can be improved by carrying out phase detection employing a charge pump and a SAR ADC. Frequency resolution of LC Digitally-Controlled Oscillators can be enhanced by a bridging capacitor technique. DPLLs can employ a Differential Ring Oscillator Integrator for implementing the integral control of the type-2 response and both achieve good jitter performance and mitigate spurious tones. DPLLs built with standard cells and synthesis tools can avoid poor TDC resolution by employing multi path technique and issues arising from clock skew by employing digital correction circuitry. Power and thermal management techniques employing PLL based clock generation can improve lock time and avoid frequency overshoots by employing a dual stage phase acquisition loop filter and improve frequency range by employing a nonlinear DCO. Digital fractional-N PLLs can improve phase noise and spurious tones performance by employing a dual-mode ring oscillator second-order FDC and can employ techniques to improve phase noise. Multiplying Delay-Locked Loops can realize Fractional-N operation and automatic cancellation of Phase Detector Offset by incorporating a TDC in the reference path.

c. In case of both Voltage Regulators (VRs) and Frequency Synthesizers (FSes), the knowledge of topologies and optional elements is represented First-Order Logic Formulae limited to two variables. A Frequency Synthesizer (FS) is a Module (FS(x)→Module(x)). DLL is a FS (DLL(x)→FS(x)). A PLL is a FS (PLL(x)→FS(x)). Nothing else is a FS. RefDivider is a Sub-Module of a DLL. FeedbackDivider is a Sub-Module of a DLL. A Basic DLL (BDLL) is a DLL. A Multiplying DLL (MDLL) is a DLL. Nothing else is a DLL. A Fractional-N MDLL (FNMDLL) is an MDLL. An Integer-N MDLL is an MDLL. Nothing else is an MDLL. The RefDivider of a BDLL is NULL11 where a NULLnm module has n inputs and its output is wired to input m. A DLL has a Ref Port. A RefDivider is a Divider. A Divider is a Module. A Port has a Net. A DLL has a Ref Port. A DLL has a Ref Net. The Ref Net of the DLL is the Net of the Ref Port of the DLL. A DLL has a PhaseDetector (PD) Sub-Module. A Sub-Module is a Module. A PD has a Ref Port. A PD has a Test Port. A PD has an Out Port. A PD has no other Ports. The Ref Port of the PD Sub-Module of a BDLL has the Ref Net of the DLL as the Net. A FNMDLL may have a Quantization Noise Canceller (QNC) Sub-Module. The QNC Sub-Module may be NULL. A QNC Module may be a Delta-Sigma Noise Canceller (DSNC).

d. The notions of Modules, Ports and Nets are identical to those in Hardware Description Languages. The design objective of the Power Distribution or Clock Distribution is represented as FOL formulae. The overall design is represented as a high dimensional vector. A Deep Convolutional Neural Network, trained using known designs, maps a design to a set of conventional cost metrics (e.g. throughput loss, latency, power, etc). The built-in predicates as well as variables in the design formulae reference both the design as well as the conventional cost metrics. A composite cost is defined as a linear combination of conventional and a regularization cost. The regularization cost is the probability that a design formula is not satisfied.

In step #4, controllers for coordinated coherence action and prefetch intensity, task-data migration (core folding), voltage-frequency scaling and power-clock gating are composed. The controller realizes algorithms similar to 6 and 7 (but carrying out coherence action and prefetch intensity, task-data migration, voltage-frequency scaling and power-clock gating control actions). The controller is further central and may be one user of the multi-user Signal Processing and Machine Learning cores with the cores also available to other users. The inputs to the controller are the measurements performed by the sensors, the statistics gathered and carried over the integrated network. The output action messages from the controller also reach actuators over the integrated network. The communication among sensors, the controller and the actuators may make use of the fixed-pipelined and circuit-switched modes of the interconnect.

In step #5, a programming/memory model is chosen and synchronization and coherence protocol messages and processor are designed.

In step #6, central allocation, scheduling and control is composed. It includes hardware assists to enable kernel to allocate tasks to PEs and data resources to CSes, to schedule tasks and transfers and to control PEs, CSes, NIs and NRs.

a. The controller realizes algorithms 6 and 7. The controller is further central and may be one user of the multi-user Signal Processing and Machine Learning cores with the cores also available to other users. The inputs to the controller are the measurements performed by the sensors, the statistics gathered and carried over the integrated network. The output action messages from the controller also reach actuators over the integrated network. The communication among sensors, the controller and the actuators may make use of the fixed-pipelined and circuit-switched modes of the interconnect.

b. The program is transformed into a directed graph—the program graph—where nodes are program sections—groups of machine instruction that end at a branch instruction or a sub-program (function or procedure) boundary—and edges are control flow. Edges are also labeled with variables such that each variable is written by the from-node or a predecessor and read by the to-node or a successor. At load time by a one-pass analysis, the entire program is broken into sections as above such that execution time of the sections exceeds some minimum overhead time and sections have roughly equal execution time. The loader also modifies the branch entering a section to do some parallelization house-keeping including assigning the section, identified by sectionIdentifier (simply a Uniform Resource Identifier incorporating the logical persistent address of the first instruction in the section), a sectionIndex if it has not already been assigned one or retrieving the sectionIndex if it has and pushing the sectionIndex on a stack and the branch exiting the section to also do parallelization house-keeping including incrementing an sectionExecutionCount and popping the stack. A section may be the body of a loop. At run time, it is determined that the program spends most of its time in a nested set of loops. Those loops are unrolled and others may be rolled back. Nodes include an ordered set of variables being written or read. If interrupts/context switches are considered disabled, the next access time for each of the variables can be predicted. So $t_{ij}$ and $v_{ij}$ are known. Some of the $v_{ij}$ are a set of variables due to use of register indirect or indexed addressing. The set nature is learnt when the register is seen—possibly at load time—being updated. The loops in the program are unrolled, Variables that are assigned more than once are made into vector variables if the assignment is in a loop or are simply made unique by introducing a new variable after each assignment. A network graph with PEs as nodes and links in the network interconnecting them as edges, mapping of program graph nodes to network graph nodes and program graph cut edges to network graph edges is optimally initialized and is kept optimal by migrating program graph nodes from their present network graph nodes to new network graph nodes.

In step #7, architecture simulation models of distinguished network hosts, network host controllers, network routers, cache slice controllers and network central controllers are generated. The simulation models adhere to the GEM framework but can adhere to another open-source or commercial framework.

In step #8, distinguished network hosts, network host controllers, network routers, cache slices, network central controller etc. are placed in the chip floor plan and the interconnection, power and clock distribution, sensor and actuator network links are placed in the chip routing plan. The Place-and-Route constraints are in DEF and LEF but can be in another open-source or commercial format.

In step #9, hardware and software modules, initial configuration and statistical model data are generated. The hardware modules are included in chip synthesis and physical design, the software modules in kernel and/or Dynamically Loaded Library build and the initial configuration and statistical model data are downloaded into chip following power-on initialization. The hardware modules include the core statistical learning and inference and operating system process/thread scheduling hardware assist and software modules network stateful load balancing label assignment (allocation) and operating system process/thread scheduling and memory allocation (data and task placement and migration and task and transfer scheduling). For sensors and control actuators both already in use and not already in use by the state-of-art versions of Operating Systems, registers exist and sensor readings can be obtained and control actuation can be performed by, respectively, reading and writing the registers.

Figure 2:
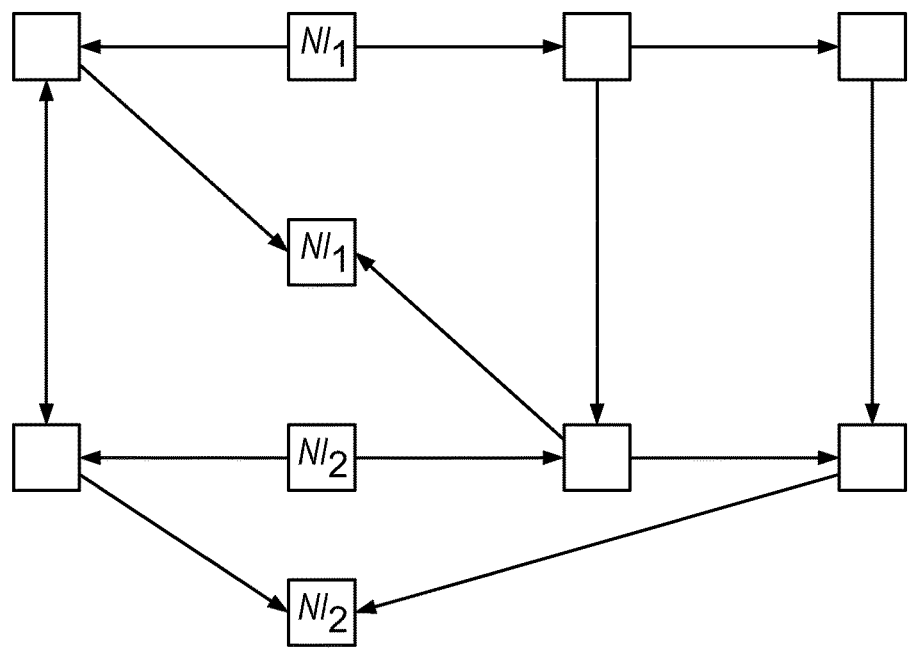
FIG. 2 is a block diagram of a hybrid crossbar and bus topology according to embodiments of the subject technology.

FIG. 2 illustrates a topology that is a hybrid of a bus and a crossbar. Network Interfaces $NI_1$ and $NI_2$ have inputs from them going to and outputs to them coming from both a crossbar and a bus. Blank boxes represent nodes in the topology.

Table 1 illustrates a time-slot plan for network interfaces and routers to operate in both frame- and packet-switching modes. Super-time-slot 1 is divided into four time slots during which transfers from 1 to 1, from 1 to 2, from 2 to 1 and from 2 to 2 only are carried out. Then, during super time slots 2 and 3, packet switching is carried out. Interruption of the operation according to this table by an on-demand fixed-pipelined transfer (FPT) is supported and is carried-out by holding frozen the state of the network unrelated to the FPT.

The NI connects to the node ($N_{ij}$). A node may be a Processor Element (PE), a Cache Slice (CS), a Memory Controller Channel (MCC), etc.

Figure 3:
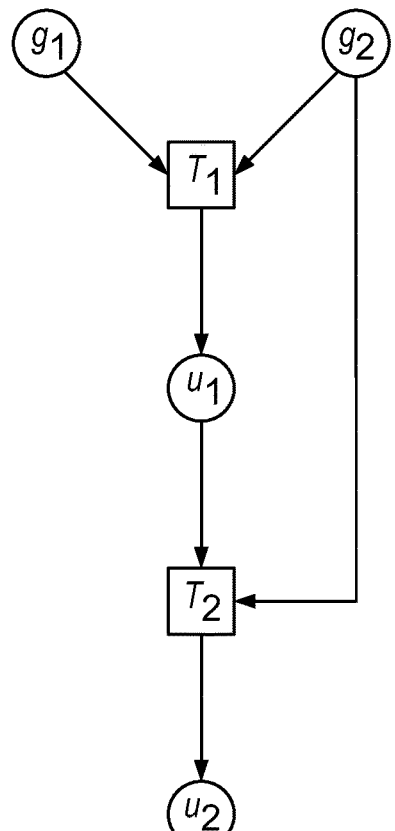
FIG. 3 is a schematic diagram of a job or task assignment configuration between chip elements according to embodiments of the subject technology.
Figure 4:
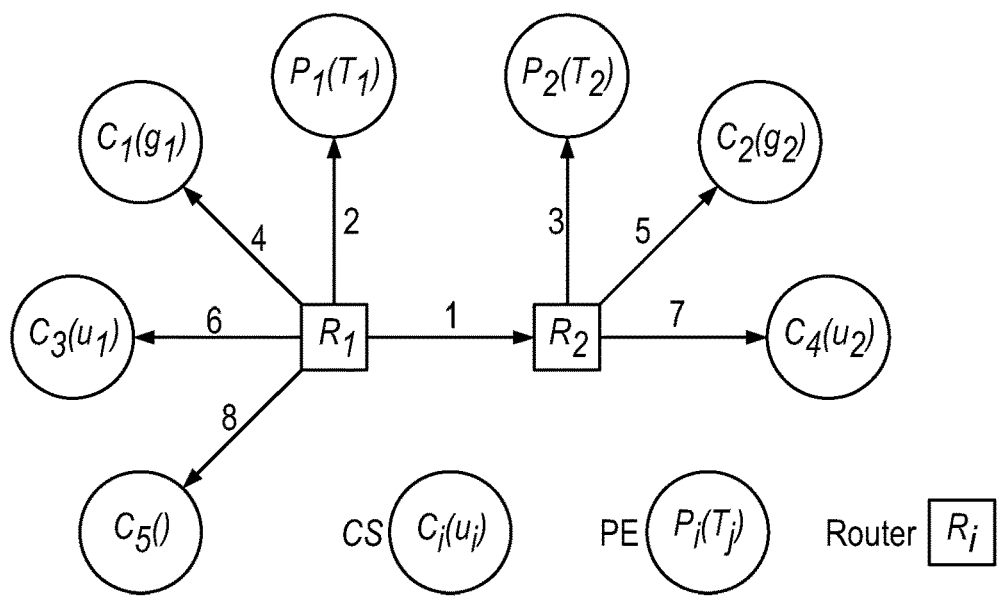
FIG. 4 is a schematic diagram of an interconnection network for a chip design according to embodiments of the subject technology.
Figure 6:
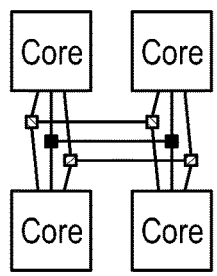
FIG. 6 compares an IC of traditional design (separate interconnects for power and clock control from data) and an IC of design by environment of invention (integrated power and clock control and data interconnect).
Figure 6:
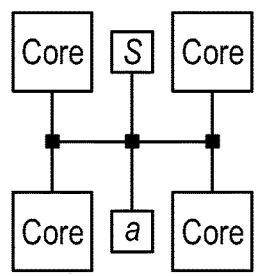
Figure 8:
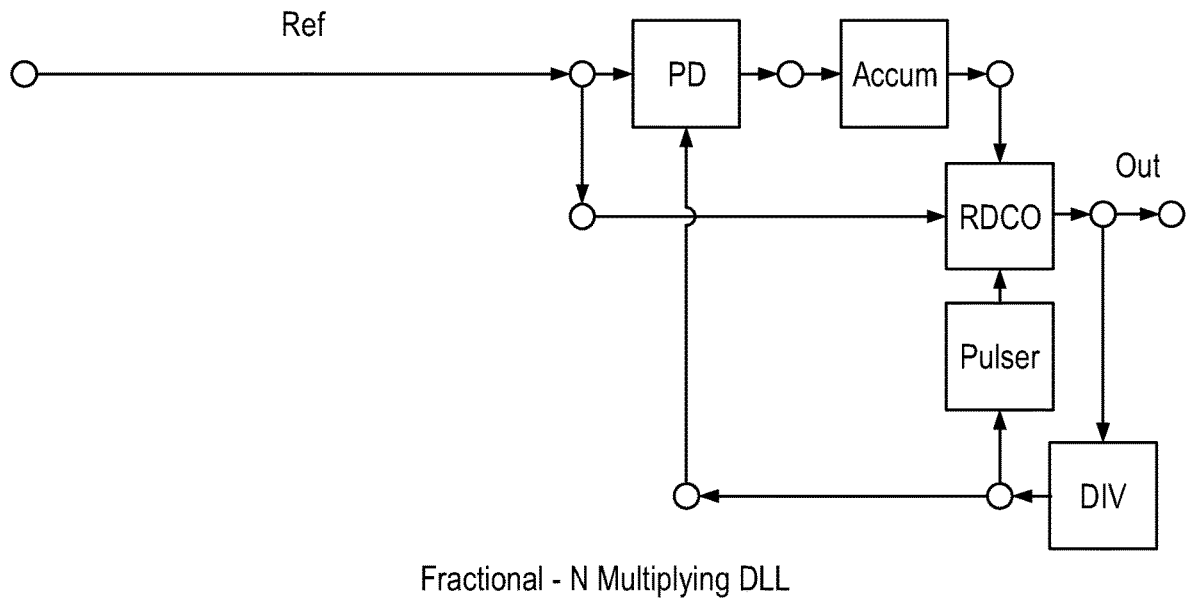
FIG. 8 is an Integer-N-Multiplying-DLL without Delta-Sigma-Quantization-Noise-Cancelling fractional-N capability.
Figure 9:
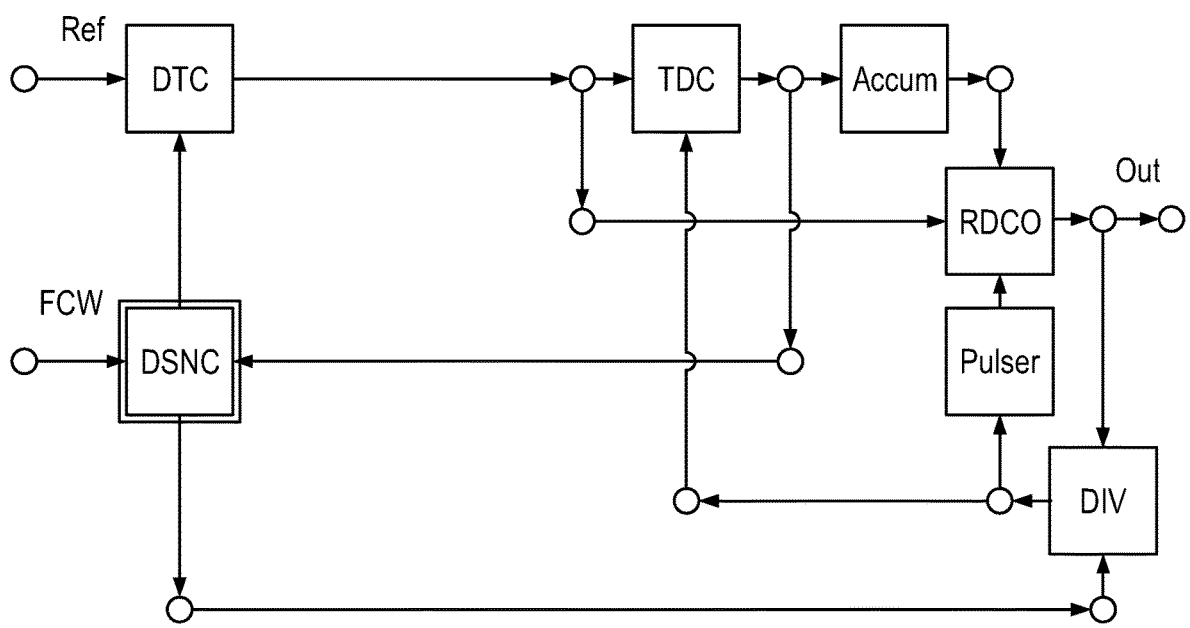
FIG. 9 is a Fractional-N-Multiplying-DLL with Delta-Sigma-Quantization-Noise-Cancellation.
Figure 10:
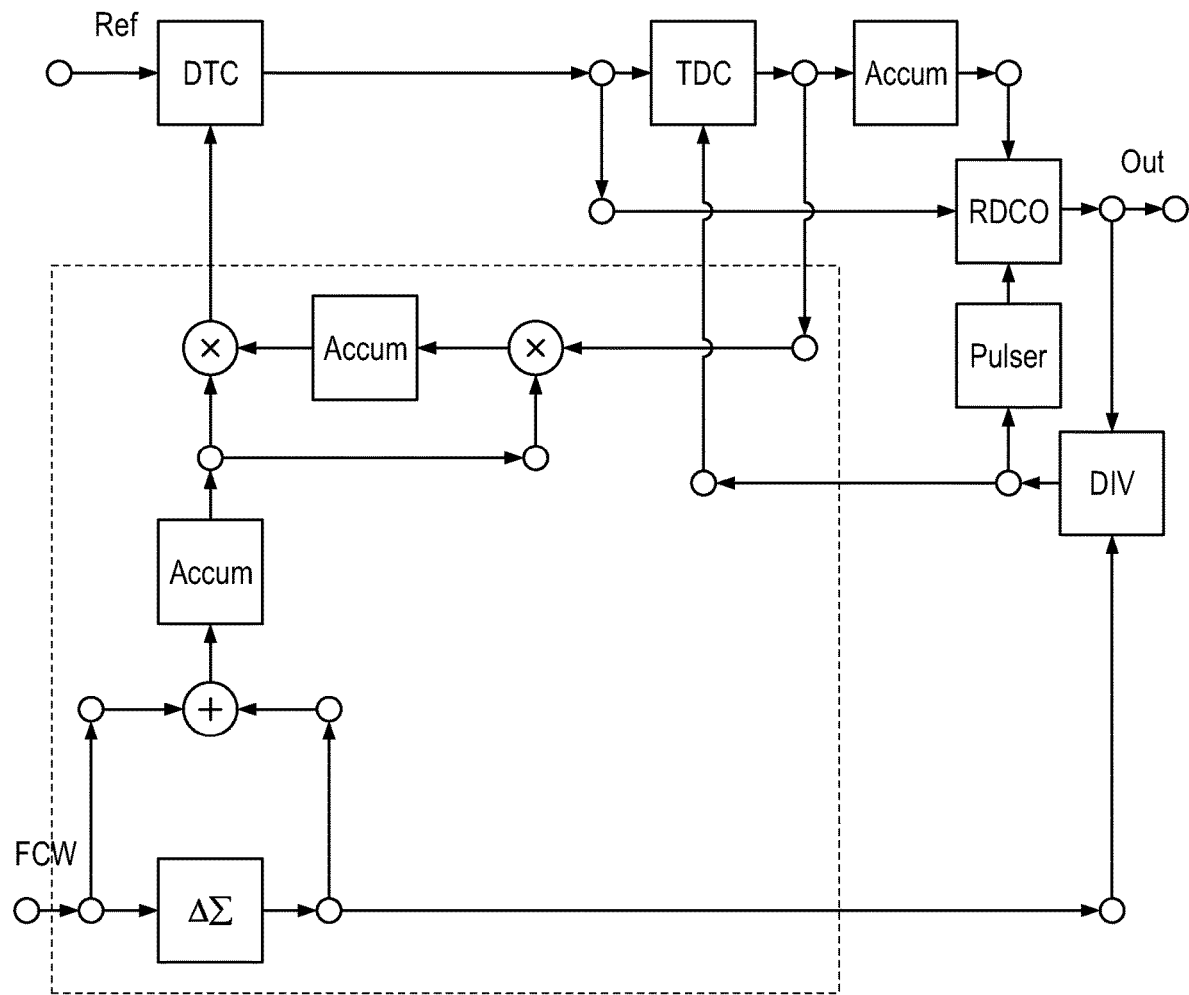
FIG. 10 is a State-of-Art Fractional-N-Multiplying-DLL with Delta-Sigma-Quantization-Noise-Cancellation.

FIG. 3 illustrates a job comprising of two tasks, making use of 'global' variables (data) g1 and g2, task 1 computing variable v1 from g1 and g2 and task 2 computing variable v2 from g2 and v1. FIG. 4 illustrates allocation and scheduling of this job on a multi-processor employing elements on a single chip. The elements may comprise two network routers (NR) (designated as the boxes labeled "R1" and "R2") connected by a point-to-point bus, PE P1, CS C1, CS C3 and CS C5 connected (via their network interfaces) to NR R1 and PE P2, CS C2 and CS C4 connected to NR R2. Global variable g1, global variable g2, task T1, variable v1, task T2 and variable v2 are allocated on PE P1, CS C1, CS C2, CS C3, PE P2 and CS C4. This requires two transfers—g2 and v2—over the large latency and power inter-router link with other transfers being local to the routers. This is the minimum number of transfers over the inter-router link. A large number of alternative allocations of tasks to PEs and data items to CSes are possible and are associated with equal or, most often, larger performance and power cost.

a. FIGS. 6 and 7 explain the difference between a conventional chip and a chip produced by the environment and tools of the invention. A conventional chip may have separate interconnect for Power and Clock Distribution Control from that for Data. A conventional chip may have no sensors and actuators or some of the controls may employ sensors and actuators that on one hand are logically the same and on the other function inconsistently with those used by another control. A conventional chip may have no Signal Processing or Machine Learning core or these cores may be available to user but not used in operation and management of the chip itself. In chips produced by the environment, sensors and actuators employ the same interconnect as Data, are shared by all controls and are placed in a planned manner. In a chip produced by the environment, Signal Processing or Machine Learning cores are multi-user and are both available to user and used for operation and management of the chip.

b. FIGS. 8, 9 and 10 explain exploration of Frequency Synthesis options. FIG. 8 shows a Integer-N Multiplying-DLL that has a NULL Delta-Sigma-Quantization-Noise-Cancelling Fractional-N capability. FIG. 9 shows a Fractional-N Multiplying-DLL with Delta-Sigma-Quantization-Noise-Cancellation Sub-Module. FIG. 10 shows a state-of-art realization of the Delta-Sigma-Quantization-Noise-Cancellation and Fractional-N Multiplication.

Step 6 refers to the allocation, scheduling and control process that employs statistical models of both policies governing actions and value of each state of network and uses it for task-PE, data-CS and flow-route allocation and task and transfer scheduling. The model employs a number of non-linear and linear transforms. The transforms serve many purposes including computing a set of feature vectors from measurements of values of variables comprising the state of the chip, representing the feature vectors employing a set of basis vectors, maintaining the basis vectors to suit the evolving context of operation of the chip and measure distances of a state from each state in a set of basis states. The parameters of these parameterized transforms to be incorporated into a chip are initialized (transfer-learnt) from global models and are then updated as necessary at run-time using on-line learning. The global models, themselves parameterized, have their parameters updated by batch learning procedures employing simulation or chip operation trace data. The on-line learning for the models has a curriculum learning phase where model is placed in a desired state and is presented with stimuli that cause state trajectories produced by actions corresponding to increasingly complex operation to be traversed. They produce decisions with low confidence scores during an initial period. During the initial period, decisions from human engineered processes are used to perform allocation and, in conjunction with decisions generated by the statistical inference, to improve (learn) the statistical models and to improve the precision of confidence scores assigned to the decisions. Eventually the models begin producing decisions that receive high confidence scores and are also used. There are several processes—e.g. Contextual Bandit or Reinforcement Learning—for learning.

As may be appreciated, all management and control are performance and power optimal or their usage of processing and communication resources is efficient, responsive, always (if different arrival processes are stationary ergodic) on path to a stable equilibrium, effective from start-up, and improve with use. Ultra-conservative guard bands are avoided and high yield, performance and power efficiency is achieved. Potential circuit timing hazards and voltage droops are managed dynamically in a variation and thermal aware manner.

Compounding of chip routing problems by wires making up data network on one hand and by networks of sensors and actuators on the other is minimized. Power cost of interconnect network, increasingly a large part of overall power cost, is minimized. Both fixed-pipelined transfers preferred for low-level and frame-switching preferred for low latency communication is supported at low hardware and power cost. Low-latency packet switching for high volume data is supported. Low latency and no- or low-loss is achieved. Network prevents live- and dead-locks. Pre-fetch data packets following a branch mis-prediction and low-priority transaction conflicting with high priority transaction traffic are preferentially discarded.

A complete range from sequential to only-upon-explicit-request of shared memory consistency models is realized. Statistics in support of tasks, e.g. speculative functions of PE, are gathered and made globally available.

Allocation, scheduling and control perform competitively or better than state-of-art human engineered process at start and then improve with use. They adapt to not only system but also to workload conditions. Optimal parallel execution of programs is inferred at run-time. Allocation and scheduling of tasks and transfers employs on-line statistical learning to consider the state of PEs, CSes and the network to efficiently take into account task and transfers completed or in progress.

On-Chip Time-Division switched networks can lower the area and power cost of realizing interconnections required by System-In-FPGA designs.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed technology may take the form of a computer program product embodied in one or more computer readable media having computer readable program code embodied thereon which may be executed by a processing unit of a general computing device as is known in the art of computing and networking.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

TABLE I

SENSORS, MONITORS, DISTINGUISHED HOSTS, AND POWER, AND CLOCK DISTRIBUTION

| No | Aspect | Symbol | No of Instances | Value |
|---|---|---|---|---|
| 1 | Max no of blocks in per-block-VFS-PCG | $n^{MB}$ | 1 | $\mathbb{I}$ |
| 1 | Max no of process sensors in a block | $n^{MP}$ | 1 | $\mathbb{I}$ |
| 1 | Max no of temperature sensors in a block | $n^{M\theta}$ | 1 | $\mathbb{I}$ |
| 1 | Max no of voltage sensors in a block | $n^{MV}$ | 1 | $\mathbb{I}$ |
| 1 | Max no of timing margin sensors in a block | $n^{MT}$ | 1 | $\mathbb{I}$ |
| 1 | Max no of clock skew sensors in a block | $n^{MC}$ | 1 | $\mathbb{I}$ |
| 1 | Max no of network link backlog sensors in a block | $n^{MQ}$ | 1 | $\mathbb{I}$ |
| 1 | Max no of inter-synchronization-domain FIFOs | $n^{MS}$ | 1 | $\mathbb{I}$ |
| 1 | Max no of core types | $n^{MG}$ | 1 | $\mathbb{I}$ |
| 1 | Max no of cores | $n^{MH}$ | 1 | $\mathbb{I}$ |
| 1 | Max no of external request types | $n^{MI}$ | 1 | $\mathbb{I}$ |
| 1 | Max no of power grid hierarchy levels | $n_{MVG}$ | 1 | $\mathbb{I}$ |
| 1 | Max no of clock grid hierarchy levels | $n_{MCG}$ | 1 | $\mathbb{I}$ |
| 1 | No of blocks in per-block-VFS-PCG | $n^B$ | 1 | $\mathbb{I}$ |
| 2 | Location of lower-left corner of block i | $(x_i^B, y_i^B)$ | $n^{MP}$ | $(\mathbb{R},\mathbb{R})$ |
| 2 | Width-length of block i | $(x_i^B, l_i^B)$ | $n^{MB}$ | $(\mathbb{R},\mathbb{R})$ |
| 1 | No of process sensors in block i | $n^{MP}$ | $n^{MB}$ | $\mathbb{I}$ |
| 1 | No of temperature sensors in block i | $n^{M\theta}$ | $n^{MB}$ | $\mathbb{I}$ |
| 1 | No of voltage sensors in block i | $n^{MV}$ | $n^{MB}$ | $\mathbb{I}$ |
| 1 | No of timing margin sensors in block i | $n^{MT}$ | $n^{MB}$ | $\mathbb{I}$ |
| 1 | No of clock skew sensors in block i | $n^{MC}$ | $n^{MB}$ | $\mathbb{I}$ |
| 1 | No of network link backlog sensors in block i | $n^{MQ}$ | $n^{MB}$ | $\mathbb{I}$ |
| 1 | No of inter-synchronization-domain FIFOs | $n^{MS}$ | 1 | $\mathbb{I}$ |
| 1 | Occupancy of inter-synchronization-domain FIFO i | $m_i^S$ | $n^{MS}$ | $\mathbb{R}$ |
| 1 | Voltage Conversion Ratio $M^V/N^V$ for the central regulator | $(M^V, N^V)$ | 1 | $(\mathbb{R},\mathbb{R})$ |
| 1 | Voltage Conversion Ratio $M_i^V/N_i^V$ for the block i regulator | $(M_i^V, N_i^V)$ | $n^{MB}$ | $(\mathbb{R},\mathbb{R})$ |
| 1 | Frequency Conversion Ratio $M^F/N^F$ for the central frequency synthesizer | $(M^F, N^F)$ | 1 | $(\mathbb{R},\mathbb{R})$ |
| 1 | Frequency Conversion Ratio $M_i^F/N_i^F$ for the block i frequency synthesizer | $(M_i^F, N_i^F)$ | $n^{MB}$ | $(\mathbb{R},\mathbb{R})$ |
| 1 | Set point for inter-synchronization-domain FIFO i | $h_i^S$ | $n^{MB}$ | $\mathbb{R}$ |
| 1 | Inter-synchronization-domain FIFO source-destination blocks i | $(c_i^{FS}, c_i^{FD})$ | $n^{MS}$ | $(\mathbb{Z}^{nMB}, \mathbb{Z}^{nMB})$ |
| 1 | Power-gate-off/-on for block i | $o_i^{VG}$ | $n^{MB}$ | $\{0, 1\}^{nMB}$ |
| 1 | Clock-gate-off/-on for block i | $c_i^{VG}$ | $n^{MB}$ | $\{0, 1\}^{nMB}$ |
| 1 | No of power grid hierarchy levels | $n^{VG}$ | 1 | $\mathbb{I}$ |
| 1 | Power grid hierarchy level i wire width | $w_i^{VG}$ | $n^{MVG}$ | $\mathbb{R}$ |
| 1 | Power grid hierarchy level i wire separation | $g_i^{VG}$ | $n^{MVG}$ | $\mathbb{R}$ |
| 1 | No of clock grid hierarchy levels | $n^{CG}$ | 1 | $\mathbb{I}$ |
| 1 | Block i power grid level, sub-grid | $(t_i^{VG}, s_i^{VG})$ | $(n^{MVG}$ | $(\mathbb{I},\mathbb{I})$ |
| 1 | Block i power grid level, sub-grid | $(t_i^{CG}, s_i^{CG})$ | $n^{MCG}$ | $(\mathbb{I},\mathbb{I})$ |

TABLE II

SENSORS, MONITORS, DISTINGUISHED HOSTS, AND POWER AND CLOCK DISTRIBUTION

| No | Aspect | Symbol | No of Instances | Value |
|---|---|---|---|---|
| 1 | No of core types | $n_G$ | 1 | $\mathbb{I}$ |
| 1 | No of cores | $n_H$ | 1 | $\mathbb{I}$ |
| 1 | Type of core i | $t_i^C$ | $n^{MH}$ | $\{0, 1\}^{nMG}$ |
| 1 | No of external request types | $n_I$ | 1 | $\mathbb{I}$ |
| 1 | Distribution over external request types | $\mu_i^I$ | $n^{MI}$ | $\mathbb{R}$ |
| 1 | Distribution over external request type input sizes - mean | $\mu_i^{IL}$ | $n^{MI}$ | $\mathbb{R}$ |
| 1 | Distribution over external request type processing time - mean | $\mu_i^{IT}$ | $n^{MI}$ | $\mathbb{R}$ |
| 1 | Distribution over external request type switching activity factor - mean | $\mu_i^{IA}$ | $n^{MI}$ | $\mathbb{R}$ |
| 1 | Distribution over external request type stable-1 factor - mean | $\mu_i^{TA}$ | $n^{MI}$ | $\mathbb{R}$ |
| 1 | Distribution over external request type output sizes - mean | $\mu_i^{OL}$ | $n^{MI}$ | $\mathbb{R}$ |
| 1 | Distribution over external request type stable-1 factor - mean | $\mu_i^{IA}$ | $n^{MI}$ | $\mathbb{R}$ |

TABLE III

HYBRID - FRAME AND PACKET - SWITCHING

| Time superslot 1 | | | | Time superslot 2 | Time superslot 3 |
|---|---|---|---|---|---|
| time slot 1 | time slot 2 | time slot 3 | time slot 4 | | |
| 1-1 | 1-2 | 2-1 | 2-2 | Packet Switch | Packet Switch |

---

Algorithm 1 Sequential, TSO or Relaxed Consistency - Transmit Network Interface

Require: i network interface id
Require: k current instant
  if there is a cell from core then
    tag generation timestamp k in cell header
    tag w ← 0 in cell header
    if cell is a write then
      w 1
    end if
    add cell to queue
  end if
  $d_i^w$ 0
  $d_i^v$ 0
  if queue non-empty then
    remove cell at head of queue
    for all j ∈ destinations of cell do
      if w = 0 in cell header then
        $d_{ij}^r$ 1
      else
        $d_{ij}^w$ 1
      end if
    end for
    output destinations vectors $d_i^r$, $d_i^w$
    output cell
  end if

---

Algorithm 2 Sequential, TSO or Relaxed Consistency - Receive Network Interface

Require: j network interface id
Require: k current instant
Require: r = true if relaxed consistency else r =false
Require: s = true if sequential consistency else s =false
Require: t = true if TSO consistency else t = false
  $m_j^r$ ← sum of jth element of all $d_i^r$ s
  $m_j^w$ ← sum of jth element of all $d_i^w$ s
  tag $m_j^r$ read and $m_j^w$ write unreserved receive cellslots with k and reserve them
  for all c, c ∈ receive cells do

---

Algorithm 2 Sequential, TSO or Relaxed Consistency - Receive Network Interface *(-continued)* s ← generation timestamp from header of c
    if w = 0 in header of c then
      place c in an read unoccupied reserved cellslot tagged s
    else
      place c in a write unoccupied reserved cellslot tagged s
    end if
  end for
  $o^r$ occupied read cellslot with smallest timestamp
  $o^w$ occupied write cellslot with smallest timestamp
  $t_o^r$ timestamp of $o^r$
  $t_o^w$ timestamp of $o^w$
  $c^r$ cell in $o^r$
  $u^r$ cell in ow
  $u^r$ reserved but unoccupied read cellslot with smallest timestamp
  $u^w$ reserved but unoccupied write cellslot with smallest timestamp
  $t_u^r$ timestamp of $u^r$
  $t_u^w$ timestamp of $u^w$
  if r then
    if $t_o^w$ ≠ null ∧ ($t_o^r$ = null ∨ $t_o^w$ < $t_o^r$) then
      forward $c^w$ to core
    else if $t_o^r$ ≠ null then
      forward $c^r$ to core
    end if
  else if t then
    if $t_o^w$ ≠ Φ ∧ ($t_u^w$ = Φ ∨ $t_o^w$ ≤ $t_u^w$) ∧ ($t^r$ = Φ ∨ (∃$t^r$ → $t^r$ ≥ $t_o^w$ ∨ $v^r$ ≠ $v_o^w$)) then
      forward $c^w$ to core
    else if $t_o^r$ ≠ Φ ∧ ($t_u^r$ = Φ ∨ $t_o^r$ ≤ $t_u^r$) ∧ ($t^w$ = Φ ∨ (∃$t^w$ → $t^w$ ≥ $t_o^r$ ∨ $v^w$ ≠ $v_o^w$)) then
      forward $c^r$ to core
    end if
  else if $t_o^w$ ≠ Φ ∧ ($t_u^w$ = Φ ∨ $t_o^w$ ≤ $t_u^w$) ∧ ($t^r$ = Φ ∨ (∃$t^r$ → $t^r$ ≥ $t_o^w$)) then
    forward $c^w$ to core
  else if $t_o^r$ ≠ Φ ∧ ($t_u^r$ = Φ ∨ $t_o^r$ ≤ $t_u^r$) ∧ ($t^w$ = Φ ∨ (∃$t^w$ → $t^w$ ≥ $t_o^r$)) then
    forward Cr to core
  end if

---

Algorithm 3 Transaction Management - Router Receive

Require: $V_{ij}^W$, set of variables resident in CS j with writes in progress by PE i
  if receive packet a request then
    $v_{pq}^X$ target var of request
    if $v_{pq}^X$ = $v_{ij}^W$ ∧ $v_{ij}^W$ ∈ $V_{ij}^W$ then

| Algorithm 3 Transaction Management - Router Receive |
| --- |
| if X = R then<br>    add packet with $v^X_{pq}$ as the payload and value<br>    of $v^W_{ij}$ as the value<br>    else if priority of $v^X_{pq}$ > priority of $v^W_{ij}$ then<br>      $V^W_{ij}$    $V^W_{ij} - \{v^W_{ij}\}$<br>      $V^W_{ij}$    $V^W_{ij} + \{v^X_{pq}\}$<br>      put the packet in queue<br>      put a NACK packet in queue with $v^W_{ij}$ as the payload<br>    else<br>      discard packet<br>      put a NACK packet in queue with $v^X_{pq}$ as the payload<br>    end if<br>  else if X = W then<br>    $V^W_{pq}$    $V^W_{pq} + \{v^X_{pq}\}$<br>    put the packet in queue<br>  else<br>    put the packet in queue<br>  end if<br>else if receive packet an ACK and receive packet EndOf-Transaction then<br>  $V^W_{qp}$ $\Phi$<br>  put the packet in queue<br>end if |

| Algorithm 4 Control (Coordinated Core Voltage-Frequency-Scaling, Folding and Power-Clock-Gating) Setup |
| --- |
| Require: n = number of cores each able to be individually voltage-frequency-scaled and power-clock-gated<br>Require: $(0, 1)^n \ni \theta_S$ = vector of core temperature sensor readings<br>Require: $\{0, 1\}^n \ni e_S$ = vector of core timing margin slsrm sensor readings<br>Require: $(0, 1)^n \ni u_S$ = vector of core voltage sensor readings<br>Require: $(0, 1)^n \ni c_S$ = vector of core Clocks-Per-Instruction meter readings<br>Require: $(0, 1)^n \ni d_S$ = vector of core fraction of sleep cycles meter readings<br>Require: $(0, 1)^n \ni q_S$ = vector of network interface queue occupancy readings<br>Ensure: $(-1, 1)^n \ni \Delta v_B$ = vector of core voltage set point steps<br>Ensure: $(-1, 1)^n \ni \Delta f_B$ = vector of core frequency set point steps |

| Algorithm 5 Allocation and Scheduling Setup |
| --- |
| Require: $\mathbb{Z}^+ \ni n_N$ = number of nodes<br>Require: $\mathbb{Z}^+ \supset n_E$ = number of links<br>Require: $\mathbb{Z}^+ \ni n_J$ = number of jobs<br>Require: $\mathbb{Z}^+ \ni n_{TT}$ = number of task types<br>Require: $\mathbb{Z}^+ \ni n_{VT}$ = number of variable types<br>Require: $\mathbb{Z}^+ \ni n_T$ = number of tasks<br>Require: $\mathbb{Z}^+ \supset n_{JI}$ = number of job instances<br>Require: $\mathbb{Z}^+ \ni n_{TI}$ = number of task instances<br>Require: $\mathbb{Z}^+ \supset n_V$ = number of variables<br>Require: $\mathbb{Z}^+ \ni n_{VR}$ = number of variable references<br>Require: $\mathbb{Z}^+ \ni n_F$ = number of flows<br>Require: $\mathbb{Z}^+ \ni m_{VI}$ = maximum number of input variable references<br>Require: $\mathbb{Z} \ni m_{VO}$ = maximum number of output variables<br>Require: $\mathbb{Z}^+ \ni n_{VI}$ = number of variable instances<br>Require: $\mathbb{Z}^+ \ni n_{VRI}$ = number of variable reference instances<br>Require: $\{0, 1\}^{nN} \ni y_{NP}$ = node a Processor Element (PE)<br>Require: $\{0, 1\}^{nN} \supset y_{NC}$ = node a Cache Slice (CS) |

| Algorithm 5 Allocation and Scheduling Setup |
| --- |
| Require: $\mathbb{Z}^{nL \times nN} \ni y_{LS}$ = link source<br>Require: $\mathbb{Z}^{nL \times nN} \supset y_{LD}$ = link destination<br>Require: $\mathbb{Z}^{nL} \ni n_{LC}$ = link capacity<br>Require: $\mathbb{Z}^{nL \times nF} \ni n_{LF}$ = link flows<br>Require: $\mathbb{Z}^{nTT} \ni n_{TTI}$ = task type number of input variable references<br>Require: $\mathbb{Z}^{nTT} \ni n_{TTO}$ = task type number of output variables<br>Require: $\mathbb{Z}^{nT} \ni n_{TTMRT}$ = task type mean run time<br>Require: $\mathbb{Z}^{nVT} \ni s_{VT}$ = variable type sizes<br>Require: $\{0, 1\}^{nT \times nTT} \ni y_{TTT}$ = task task type<br>Require: $\{0, 1\}^{nT \times nJ} \supset y_{TJ}$ = task job<br>Require: $\{0, 1\}^{nT \times mVI \times nVR} \ni y_{TVI}$ = task input variable references<br>Require: $\{0, 1\}^{nT \times mVO \times nV} \ni y_{TVO}$ = task output variable references |

| Algorithm 6 Allocation, Scheduling and Control Run |
| --- |
| Require: $\{0, 1\}^{nJI \times nJ} \ni y_{JIJ}$ = job instance job<br>Require: $\{0, 1\}^{nTI \times nT} \supset y_{TIT}$ = task instance task<br>Require: $\{0, 1\}^{nTI \times nVRI} \ni y_{TIVRI}$ = task instance input variable reference instances<br>Require: $\{0, 1\}^{nTI \times nVI} \ni y_{TIVO}$ = task instance output variable instances<br>Require: $\{0, 1\}^{nTI \times nN} \ni n_{TIN}$ = task instance node<br>Require: $\mathbb{Z}^{nTI} \ni n_{TIRST}$ = task instance run start time<br>Require: $\mathbb{Z}^{nTI} \ni y_{TIRC}$ = task instance run complete<br>Require: $\{0, 1\}^{nVI \times nVT} \ni y_{VVT}$ = variable variable type<br>Require: $\{0, 1\}^{nVI \times nV} \ni y_{VIV}$ = variable instance variable<br>Require: $\{0, 1\}^{nVI \times nN} \ni y_{VIN}$ = variable instance node<br>Require: $\{0, 1\}^{nVI} \supset y_{VIR}$ = variable instance ready<br>Require: $\mathbb{Z}^{nVI} \ni n_{VIRS}$ = variable instance remain transfer size<br>Require: $\{0, 1\}^{nRI \times nVR} \ni y_{VRIVR}$ = variable reference instance variable reference<br>Require: $\{0, 1\}^{nVRI} \ni y_{VRIR}$ = variable reference instance ready<br>Require: $\mathbb{Z}^{nVRI} \ni y_{VRIR}$ = variable reference instance remain transfer size<br>Require: $\{0, 1\}^{nF} \ni y_{FO}$ = flow output<br>Require: $\{0, 1\}^{nF \times nVI} \ni y_{FVI}$ = flow variable instance<br>Require: $\{0, 1\}^{nF \times nVRI} \ni y_{FVRI}$ = flow variable reference instance<br>Require: $\{0, 1\}^{nF \times nL} \ni y_{FL}$ = flow links<br>Require: $\phi, \psi$ = non-linear transformations<br>Require: G, H = linear transformations<br>Ensure: $\{0, 1\}^{nTI \times nN} \ni y_{TIN}$ = allocate task instance to node<br>Ensure: $\{0, 1\}^{nTI} \ni y_{TIR}$ = task instance run<br>Ensure: $\{0, 1\}^{nVI \times nN} \ni y_{VIN}$ = allocate variable instance to node<br>Ensure: $\{0, 1\}^{nF \times nL} \ni y_{FL}$ = allocate flow to links<br>Ensure: $\{0, 1\}^{nF} \ni y_{FR}$ = flow run<br>$x_0 \leftarrow$    $(\theta_S, e_S, u_S, c_S, d_S, q_S)$<br>$x_1$    $(n_N, n_E, n_J, n_{TT}, n_{VT}, n_T, n_{JI}, n_{TI}, n_V)$<br>$x_2$    $(n_{VR}, n_F, m_{VI}, m_{VO}, n_{VI}, n_{VRI}, y_{NP}, y_{NC})$<br>$x_3$    $(y_{LS}, y_{LD}, n_{LC}, n_{LF}, n_{TTI}, n_{TTO}, n_{TTMRT})$<br>$x_4$    $(s_{VT}, y_{TTT}, y_{TJ}, y_{TVI}, y_{TVO}, y_{JIJ})$<br>$x_5$    $(y_{TIT}, y_{TIVRI}, y_{TIVO}, n_{TIN}, n_{TIRST})$<br>$x_6$    $(y_{TIRC}, y_{VVT}, y_{VIV}, y_{VIN}, y_{VIR}, n_{VIRS})$<br>$x_7$    $(n_{VR}, y_{VRIR}, y_{FO}, y_{FVI}, y_{FVRI}, y_{FL})$<br>$x$    $(x_0, x_1, x_2, x_3, x_4, x_5, x_6, x_7)$<br>$y \leftarrow$    $\psi(G \phi (H x))$<br>$(\Delta v_B, \Delta f_B, y_{TIN}, y_{TIR}, y_{VIN}, y_{FL}, y_{FR})$ y |

What is claimed is:

1. A method of synthesizing a design of a multi-core system on a chip, comprising:

a knowledge base of compositions of cache memories, memory controllers, voltage regulators, frequency synthesizers, network interfaces, network routers, etc. as a collection of probabilistic logical formulae and that is periodically updated to reflect the state-of-art, reading a library and a chip description into a model synthesizer, wherein the chip description includes a plurality of processor elements and operating condition, performance, cost and low-level and peripheral element constraint logic formulae;
selecting a network topology for the chip floor plan, wherein the network topology includes:
general purpose and domain specific processor elements,
cache slice memories, external memory controller channels, sensors, network routers and network interfaces connecting the plurality of processor elements,
voltage regulators, and
frequency synthesizers, wherein the cache slice memories, external memory controller channels, sensors, network routers, network interfaces, voltage regulators, and frequency synthesizers are composed based on selected application and design constraints;
selecting placement of the processor elements, cache slice memories, external memory controller channels, sensors, network routers, network interfaces, voltage regulators, and frequency synthesizers in the network topology;
selecting placement of voltage regulation, frequency synthesis, power distribution and clock distribution and inter-synchronization-domain FIFO control actuation elements;
selecting topologies of power and the clock distribution network links and a topology and modes of operation of an integrated network for data communication and for communication with the sensors and the actuation elements where the network concurrently supports fixed-pipelined, circuit-switched and packet-switched transfers and provides high level services including message order enforcement in support of consistency model, transaction conflict detection in support of transactional execution and early discard of pre-fetch traffic invalidated by branch mis-prediction and low-priority transaction conflicting with high priority transaction;
composing controllers for coordinated coherence action and prefetch intensity, voltage droop, clock skew, timing margin, voltage-frequency scaling and power-clock gating;
selecting a programming model from among distributed memory with message passing, logically shared over physically distributed memory and shared memory;
designing synchronization and coherence protocol messages for the programming model that span from strict to only-upon-explicit-request;
composing a central allocation, scheduling and control engine for the plurality of elements;
generating an architecture simulation model of distinguished hosts, the network interfaces, the network routers and of network central controllers;
positioning the distinguished hosts, the network routers, the network interfaces, and the network central controllers in the chip floor plan; and
positioning the interconnection networks and the power and clock distribution network links in a chip routing plan.

2. The method of claim 1, further comprising generating hardware and software modules, initial configuration and statistical model data according to the generated architecture, the chip floorplan and the chip routing plan.

3. The method of claim 1, further comprising selecting placement of process, temperature, power, voltage, timing margin, network traffic intensity, node and link backlog and inter-synchronization-domain first in, first out (FIFO) occupancy sensing and statistics gathering elements for placement on the chip floorplan.

4. The method of claim 1, further comprising observing, in simulation, a performance of the plurality of elements in the chip RTL model and making anonymized observations available to update a shared statistical model.

5. The method of claim 4, further comprising observing in simulation, measurements of the plurality of elements on fabricated integrated circuits and making anonymized observations available to update a shared statistical model.

6. The method of claim 1, further comprising using a statistical model trained to minimize estimation error to determine a number of and positions of process, voltage, power, temperature, timing margin, inter-synchronization-domain FIFO occupancy, node and link backlog and network traffic intensity sensors.

7. The method of claim 1, further comprising determining the placement of voltage regulators and frequency synthesizers by statistical inference using a statistical model trained to minimize a response time to bring voltage and/or frequency within an acceptable range after transients are observed in simulation.

8. The method of claim 1, further comprising composing cache slice memories, external memory controllers, voltage regulators and frequency synthesizers, selecting topologies of the power and clock distribution and the topology and modes of operation of the integrated network for data communication and for communication with sensors and actuators to minimize a composite cost with power, latency and loss of throughput as an empirical cost and probability of a logic formula being false as a regularization cost.

9. The method of claim 8 where the compositions and topologies are initialized to an initial state, are then iteratively improved using incremental improvement actions with the help of a distribution and a cost function approximation, the distribution assigning probability to state-action pairs of action in state leading to sequence of states with least expected composite cost, cost function approximating the expected composite cost and the distribution and cost function approximations learnt from observing the cost in simulation and during operation of fabricated IC.

10. The method of claim 1, further comprising composing coordinated pre-fetch and coherence-action intensity, voltage droop, clock skew, timing margin, voltage-frequency scaling and power-clock gating controls comprising:
a set of state variable registers;
a first logic configured to receive and process messages over the integrated network including from sensor and statistics gathering elements to update the set of state variable registers; and
a second logic comprising a statistical model to perform inference to accept the set of state variables as input and to produce action as output.

11. The method of claim 10, further comprising a third logic comprising a reward function to accept the set of state variables and action as input and to produce a reward quantity as output.

12. The method of claim 11, further comprising a fourth logic configured to generate and send over the integrated network actuation messages to control actuators.

13. The method of claim 12, further comprising a fifth logic comprising learning functions to derive from a shared model or to randomly initialize the statistical model, to accept the set of state variables, action and reward as inputs and to update the statistical model used to perform inference.

14. The method of claim 1, wherein the composing of the central allocation and scheduling engine comprises:
- a set of state variable registers;
- a first logic configured to receive and process messages over the integrated network to update the set of state variable registers; and
- a second logic comprising a statistical model to perform inference to accept the set of state variables as input and to produce action as output.

15. The method of claim 14, wherein the composing of the central allocation and scheduling engine further comprises:
- a third logic comprising a reward function to accept the set of state variables and action as input and to produce a reward quantity as output.

16. The method of claim 14, wherein the composing of the central allocation and scheduling engine further comprises:
- a third logic configured to update scheduling and allocation recommendations data structures.

17. The methods of claim 14, further comprising an input, state or state and stimulus variables employing a one-hot representation using a number of bits equal to the maximum number for configurations of interest allowing learning to be carried out using configurations with small number of entities but inference able to be performed for configurations with up to the maximum number.

18. The method of claim 17 where learning and inference logic is multi-user and is able to be simultaneously used by control of the IC and the applications.

19. The method of claim 1, wherein the interconnection networks are placed to connect processing, I/O, memory elements, the sensors and the actuation elements.

* * * * *